United States Patent
Xiao et al.

(10) Patent No.: US 10,346,094 B2
(45) Date of Patent: Jul. 9, 2019

(54) STORAGE SYSTEM, STORAGE DEVICE, AND HARD DISK DRIVE SCHEDULING METHOD

(71) Applicant: Huawei Technologies Co., Ltd., Shenzhen, Guangdong (CN)

(72) Inventors: Shihai Xiao, Hangzhou (CN); Le Chang, Shenzhen (CN); Wei Yang, Hangzhou (CN); Chen Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/980,584

(22) Filed: May 15, 2018

(65) Prior Publication Data
US 2018/0260162 A1    Sep. 13, 2018

Related U.S. Application Data

(63) Continuation of application No. PCT/CN2015/094718, filed on Nov. 16, 2015.

(51) Int. Cl.
G06F 12/00 (2006.01)
G06F 3/06 (2006.01)
G06F 11/30 (2006.01)

(52) U.S. Cl.
CPC .......... *G06F 3/0659* (2013.01); *G06F 3/0611* (2013.01); *G06F 3/0634* (2013.01); *G06F 3/0689* (2013.01); *G06F 11/30* (2013.01)

(58) Field of Classification Search
None
See application file for complete search history.

(56) References Cited

U.S. PATENT DOCUMENTS

| 5,423,046 A | 6/1995 | Nunnelley et al. |
| 6,966,006 B2 | 11/2005 | Pacheco et al. |
| 8,028,126 B2 | 9/2011 | Bougaev et al. |
| 8,296,513 B1 * | 10/2012 | Liu ........................ G06F 1/3268 360/69 |

(Continued)

FOREIGN PATENT DOCUMENTS

| CN | 101154131 A | 4/2008 |
| CN | 101344812 A | 1/2009 |

(Continued)

OTHER PUBLICATIONS

Balakrishnan et al.; "Pelican: A Building Block for Exascale Cold Data Storage"; Proceedings of the 11th USENIX Symposium on Operating Systems Design and Implementation; Oct. 6-8, 2014; Broomfield, CO; 16 pages.

*Primary Examiner* — John A Lane

(57) ABSTRACT

This application discloses a storage system, a storage device, and a hard disk drive scheduling method. The storage system includes M disk groups, a power supply system, and a controller, and M is a natural number not less than 3. Each of the M disk groups includes at least one hard disk drive. The controller is configured to control a hard disk drive in a first disk group of the M disk groups to be in an active state to process a first group of service requests, and control a hard disk drive in a second disk group of the M disk groups to switch from the inactive state to a spin up state when the hard disk drive in the first disk group is in the active state.

21 Claims, 12 Drawing Sheets

(56) References Cited

U.S. PATENT DOCUMENTS

| | | | |
|---|---|---|---|
| 8,745,327 B1* | 6/2014 | Throop | G06F 3/0647 |
| | | | 711/114 |
| 8,868,954 B1 | 10/2014 | Balakrsihnan et al. | |
| 9,158,466 B1* | 10/2015 | Sahin | G06F 3/0625 |
| 2005/0154962 A1* | 7/2005 | Grover | G11B 19/20 |
| | | | 714/763 |
| 2006/0107099 A1 | 5/2006 | Pinheiro et al. | |
| 2007/0061509 A1* | 3/2007 | Ahluwalia | G06F 1/3221 |
| | | | 711/112 |
| 2008/0005461 A1* | 1/2008 | Toda | G06F 1/3221 |
| | | | 711/112 |
| 2008/0082845 A1 | 4/2008 | Morisawa | |
| 2010/0122050 A1* | 5/2010 | Hutchison | G06F 3/0611 |
| | | | 711/162 |
| 2010/0238574 A1 | 9/2010 | Balasubramanian | |
| 2015/0277801 A1* | 10/2015 | Konishi | G06F 3/0625 |
| | | | 711/114 |

FOREIGN PATENT DOCUMENTS

| | | |
|---|---|---|
| CN | 101446857 A | 6/2009 |
| WO | 2007/110577 A1 | 10/2007 |

\* cited by examiner

STORAGE SYSTEM, STORAGE DEVICE, AND HARD DISK DRIVE SCHEDULING METHOD

CROSS-REFERENCE TO RELATED APPLICATIONS

This application is a continuation of International Application No. PCT/CN2015/094718, filed on Nov. 16, 2015, the disclosure of which is hereby incorporated by reference in its entirety.

TECHNICAL FIELD

The present disclosure relates to the field of storage technologies, and in particular, to a storage system, a storage device, and a hard disk drive scheduling method.

BACKGROUND

Cold storage is an implementation of storage at a data center, and cold storage is applicable to data that needs to be saved but is rarely read. With arrival of a big data era, cold storage has gradually become a topic of great concern. Because data is rarely accessed, a performance requirement of cold storage for a storage device is not high. To reduce storage costs, for cold storage, a storage device with a large capacity, low power, and low costs may be used. For conventional cold storage, a magnetic tape library is usually used to store data. However, the magnetic tape library has a relatively high access delay. To reduce an access delay in a data reading process, in the prior art, there is a solution of implementing cold storage using a hard disk drive or solid state drive. However, this solution of implementing cold storage using a hard disk drive or solid state drive not only has high costs, but also has relatively high power.

To reduce system power, a storage device provided in the prior art includes multiple scheduling domains that work independently, and each scheduling domain includes multiple groups of hard disk drives. At any moment, only a maximum of one group of hard disk drives are allowed to spin up simultaneously or work simultaneously in a same scheduling domain. For any scheduling domain, the storage device separately schedules different disk groups according to a request queue to process service requests. For this disk group scheduling manner in the prior art, system power is reduced, but a switching time length between disk groups is introduced. The switching time length may be several seconds or even dozens of seconds. Therefore, when multiple service requests are being processed, if the service requests are alternately distributed on different disk groups, frequent switching between the disk groups is caused, and a processing delay is increased.

SUMMARY

Embodiments of the present disclosure provide a storage system, a storage device, and a hard disk drive scheduling method, so that when multiple service requests are being processed, a service processing delay is reduced while system power is reduced.

According to a first aspect, this application provides a storage system. The storage system includes M disk groups, a power supply system, and a controller, and M is a natural number not less than 3. Each of the M disk groups includes at least one hard disk drive configured to store data, and a status of each hard disk drive includes an inactive state, a spin up state, and an active state. The power supply system supplies power to the storage system. The power supplied by the power supply system allows one of the M disk groups to be in the active state and another one of the M disk groups to be in the spin up state. The controller is connected to the M disk groups. The controller is configured to control a hard disk drive in a first disk group of the M disk groups to be in the active state, and control a hard disk drive in a second disk group of the M disk groups to switch from the inactive state to the spin up state when the hard disk drive in the first disk group is in the active state e. The first disk group is used to process a first group of service requests in a request queue, and the second disk group is used to process a second group of service requests in the request queue. The active state is a state in which a platter of the hard disk drive is in a spinning state and a spin speed reaches a fixed spin speed required for processing data. The inactive state is a state in which a platter of the hard disk drive does not spin. The spin up state is a state of the hard disk drive during a period from a time point at which the hard disk drive is powered on to a time point at which a spin speed of a platter reaches a fixed spin speed required for processing data.

As a solution to cold storage, the power supply system in the storage system (including the M disk groups) provided in this application allows one of the M disk groups to be in the active state and another one of the M disk groups to be in the spin up state. In other words, the storage system provided in this application does not allow all disk groups in the storage system to be simultaneously in the active state or the spin up state. Therefore, the storage system provided in this application reduces system power. In addition, in a storage system working process, the storage system provided in this application controls the second disk group to be in the spin up state while controlling, according to the power supplied by the power supply system, the first disk group in the storage system to be in the active state, so that the two disk groups in the storage system can process service requests in parallel, thereby reducing a system waiting time length in a spin up process of a disk group that is not spun up for the first time, and reducing a time length for processing the service requests. Therefore, when processing multiple service requests, the storage system provided in this application can reduce a service processing delay while reducing system power.

With reference to the first aspect, in a first implementation of the first aspect, the controller is further configured to receive multiple service requests, and obtain the request queue according to the received multiple service requests, where the request queue includes at least the first group of service requests and the second group of service requests that are sorted according to a processing sequence. For example, the controller may group service requests within a preset time period according to a preset time window and different accessed disk groups, to obtain multiple groups of service requests that are separately processed by different disk groups, and sort the groups of service requests in a unit of a group of service requests. According to the manner for grouping and sorting service requests is used, a disk group in the active state can process as many service requests as possible, and a work capability of the disk group can be used to the greatest extent, thereby further reducing system power and reducing a service processing delay.

With reference to the first possible implementation of the first aspect, in a second possible implementation, the request queue further includes a third group of service requests, the third group of service requests are sorted after the second group of service requests in the request queue, and the third group of service requests are service requests to be processed by a third disk group of the M disk groups; the controller is further configured to determine that either of the first group of service requests and the second group of service requests have been completely processed and a spin up time point of the third disk group has not arrived; and the controller controls a disk group that has completely processed the service requests to process the $F^{th}$ group of service requests in the request queue, where the $F^{th}$ group of service requests are located after the third group of service requests in the request queue, and the $F^{th}$ group of service requests are service requests that are not processed by the disk group that has completely processed the service requests. According to the manner in which after it is determined that a spin up time point of a next disk group has not arrived, subsequent service requests for a disk group that has completely processed current service requests are processed in advance, a disk group that has been spun up can process as many service requests as possible, thereby further reducing a quantity of repeated spin-up times of the disk group, reducing system power, and reducing an average delay for processing multiple service requests.

With reference to the second possible implementation of the first aspect, in a third possible implementation, when the first disk group and the second disk group are simultaneously in the active state, the controller is further configured to: switch the first disk group or the second disk group from the active state to the inactive state when the spin up time point of the third disk group has arrived; and control the third disk group to switch from the inactive state to the spin up state.

With reference to the first possible implementation of the first aspect, in a fourth possible implementation, the request queue further includes a third group of service requests, the third group of service requests are sorted after the second group of service requests in the request queue, and the third group of service requests are service requests to be processed by a third disk group of the M disk groups. In the request queue, an execution time length of the first group of service requests is not less than a sum of an execution time length of the second group of service requests, spin up duration of the hard disk drive in the second disk group, and spin up duration of a hard disk drive in the third disk group. The controller is further configured to: determine that the second disk group completely processes the second group of service requests when the first disk group processes the first group of service requests; control the second disk group to switch to the inactive state; and control the third disk group to switch from the inactive state to the spin up state. In the storage system provided in this application, because a service request processing time length and spin up duration of the disk group are fully considered in the process of obtaining the request queue, when a parallel processing capability of multiple disk groups is fully used, a seamless connection can be implemented between work of different disk groups as much as possible, so as to ensure that when one disk group is in the active state, another disk group is in the spin up state or the active state, thereby further reducing a service processing delay.

With reference to the first possible implementation of the first aspect, in a fifth possible implementation, the request queue further includes a third group of service requests, the third group of service requests are sorted after the second group of service requests in the request queue, and the third group of service requests are service requests to be processed by a third disk group of the M disk groups. The controller is further configured to: after determining that either of the first group of service requests and the second group of service requests have been completely processed, control a disk group that has completely processed the service requests to switch to the inactive state; and control the third disk group to switch from the inactive state to the spin up state.

According to a second aspect, this application provides a storage system, and the storage system includes M disk groups, a power supply system, and a controller. Each of the M disk groups includes at least one hard disk drive configured to store data, a status of each hard disk drive includes an inactive state, a spin up state, and an active state, and M is a natural number not less than 4. The power supply system is configured to supply power to the storage system. The power supplied by the power supply system allows X of the M disk groups to be in the active state, and hard disk drives in Y of the M disk groups to be in the spin up state. The controller is connected to the M disk groups. The controller controls hard disk drives in P of the M disk groups to be in the active state, and controls hard disk drives in Q of the M disk groups to switch from the inactive state to the spin up state when the hard disk drives in the P disk groups are in the active state. P is a natural number not greater than X, and the P disk groups are used to process P groups of service requests in a request queue. Q is a natural number not greater than Y, the Q disk groups are used to process Q groups of service requests in the request queue, and a value of P+Q is not less than 3. The active state is a state in which a platter of the hard disk drive is in a spinning state and a spin speed reaches a fixed spin speed required for processing data. The inactive state is a state in which a platter of the hard disk drive does not spin, and the spin up state is a state of the hard disk drive during a period from a time point at which the hard disk drive is powered on to a time point at which a spin speed of a platter reaches a fixed spin speed required for processing data.

Similar to the storage system provided in the first aspect of this application, because the storage system provided in the second aspect of this application cannot allow simultaneous working or spinning up of the M disk groups in the storage system, but can only allow Y disk groups to be in the spin up state while the X of the M disk groups are in the active state, so that when system power is reduced, a work time length of some disk groups can be fully used to spin up another disk group, to perform time multiplexing. A parallel processing capability of multiple disk groups in the system is used to the greatest extent, thereby reducing a system waiting time length in a spin up process of a disk group that is not spun up for the first time, and reducing a service processing delay.

With reference to the second aspect, in a first possible implementation of the second aspect, the controller is further configured to: receive multiple service requests, and obtain the request queue according to the multiple service requests. The request queue includes at least the P groups of service requests and the Q groups of service requests that are sorted according to a processing sequence. According to the manner for grouping and sorting service requests, a disk group in the active state can process as many service requests as possible, thereby further reducing system power and reducing a service processing delay.

With reference to the first possible implementation of the second aspect, in a second possible implementation of the second aspect, the request queue further includes Z groups of service requests, the Z groups of service requests are service requests to be processed by Z of the M disk groups except P+Q disk groups, and Z is a natural number not less than 1 and not greater than Y. The controller is further configured to: when determining that N groups of service requests of the $P^{th}$ group of service requests and the $Q^{th}$ group of service requests have been completely processed and a spin up time point of the Z disk groups has not arrived, control N disk groups that have completely processed the N groups of service requests to separately process N groups of to-be-processed service requests in the request queue. N is a natural number not greater than P+Q, the N groups of to-be-processed service requests are located after the Z groups of service requests in the request queue, and the N groups of to-be-processed service requests are separately service requests to be processed by the N disk groups. According to the storage system provided in this implementation, subsequent service requests for a disk group that has completely processed current service requests can be processed as early as possible, so that multiple disk groups that have been spun up can process as many service requests as possible, thereby reducing a quantity of repeated spin-up times of the disk group, reducing system power, and further reducing an average delay for processing multiple service requests.

With reference to the second possible implementation of the second aspect, in a third possible implementation of the second aspect, when P=X, Q=Y, and X+Y disk groups are simultaneously in the active state, the controller is further configured to: calculate power required for spinning up the Z disk groups when the spin up time point of the Z disk groups has arrived. Then, the controller switches, according to the power required for spinning up the Z disk groups, W of the X+Y disk groups in the active state from the active state to the inactive state, and switches the Z disk groups from the inactive state to the spin up state. W is a natural number not less than Z and less than X+Y, and power released for switching the W disk groups from the active state to the inactive state is not less than the power required for spinning up the Z disk groups. According to the storage system provided in this implementation, a quantity of disk groups that need to be closed can be determined according to system power of Z disk groups that are to be spun up when the spin up time point of the Z disk groups has arrived. Therefore, a power supply capability of the power supply system is fully used, so that a quantity of disk groups in the active state in the storage system is kept the greatest, and the capability of processing service requests in parallel by disk groups in the storage system can be fully used, thereby reducing a service processing delay.

With reference to the second possible implementation of the second aspect, in a fourth possible implementation of the second aspect, when X+Y disk groups are simultaneously in the active state, the controller is further configured to: when determining, according to the spin up time point of the Z disk groups, that the Z disk groups need to be switched from the inactive state to the spin up state, switch the Y of the X+Y disk groups in the active state from the active state to the inactive state; and control the Z disk groups to switch from the inactive state to the spin up state. According to the storage system provided in this implementation, when the X+Y disk groups are simultaneously in the active state, if the Z disk groups need to be spun up, only X of the X+Y disk groups in the active state are kept in the active state, so as to spin up the Z disk groups. In addition to reduction of power and reduction of a system delay, this manner for switching and spinning up disk groups is more convenient and easy to operate.

With reference to the second possible implementation of the second aspect, in a fifth possible implementation of the second aspect, when N is less than P+Q, the controller is further configured to: when determining that the N of the P+Q disk groups are switched from the active state to the inactive state, calculate power released by the N disk groups; and switch S of the M disk groups from the inactive state to the spin up state according to the power released by the N disk groups. S is a natural number not less than 1 and not greater than N, and the power released by the N disk groups is not less than power required for spinning up the S disk groups. According to the disk groups provided in this implementation, when the N disk groups have no services to process, another one of the M disk groups can be spun up in advance according to power released for closing the N disk groups that have no services. Therefore, an average delay for processing services can be further reduced.

According to a third aspect, this application provides a storage device, and the storage device includes M disk groups and a controller in the storage system provided in the first aspect.

According to a fourth aspect, this application provides another storage device, where the storage device includes M disk groups and a controller in the storage system provided in the second aspect.

According to a fifth aspect, this application provides a hard disk drive scheduling method, and the hard disk drive scheduling method is performed by the storage device provided in the third aspect, and can implement functions implemented by a controller in the storage system provided in the first aspect.

According to a sixth aspect, this application provides another hard disk drive scheduling method, and the hard disk drive scheduling method is performed by the storage device provided in the fourth aspect, and can implement functions implemented by a controller in the storage system provided in the second aspect.

According to a seventh aspect, this application provides a computer program product, including a computer readable storage medium that stores program code, where an instruction included in the program code may be executed by the foregoing controller and used to perform at least one method in the fifth aspect and the sixth aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DESCRIPTION OF EMBODIMENTS

To make a person skilled in the art understand the technical solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure.

Figure 1:
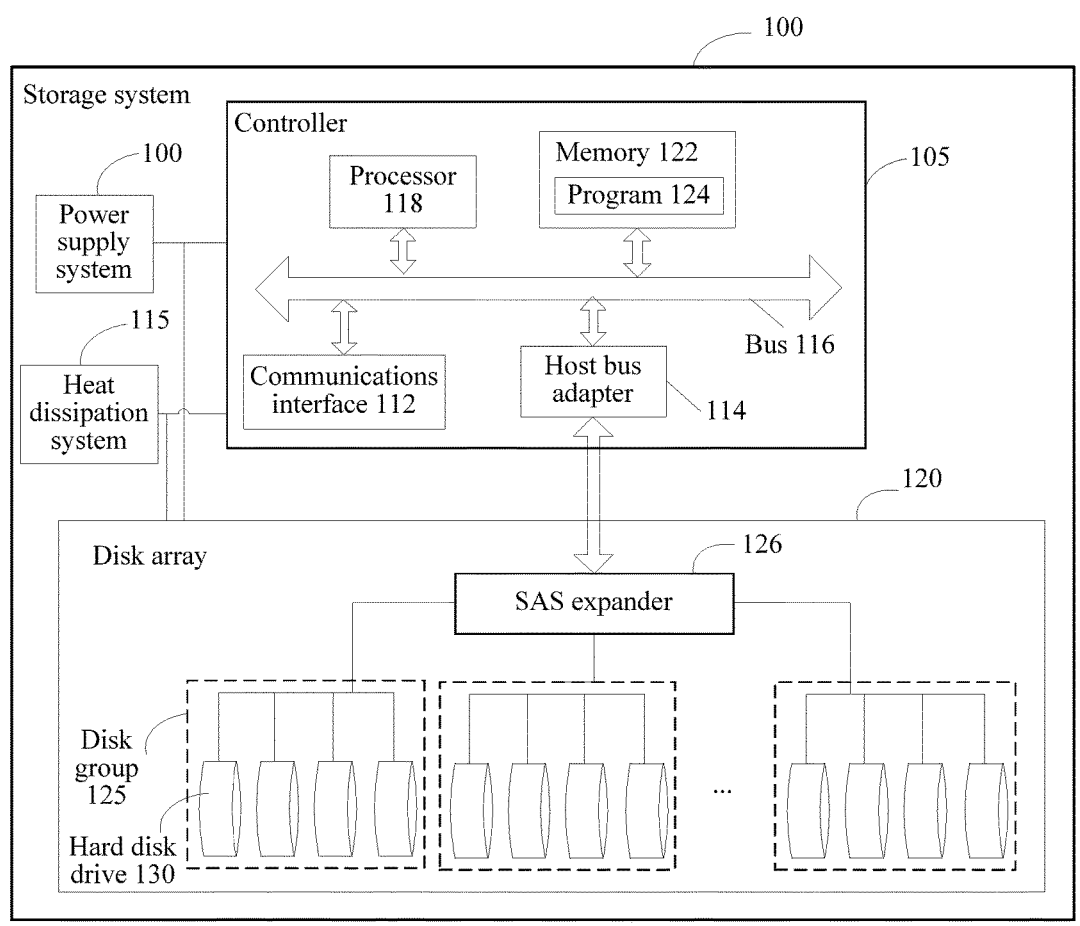
FIG. 1 is a schematic structural diagram of a storage system according to an embodiment of the present disclosure.

FIG. 1 is a schematic structural diagram of a storage system according to an embodiment of the present disclosure. The storage system 100 shown in FIG. 1 may include a controller 105, a disk array 120, a power supply system 110, and a heat dissipation system 115.

The controller 105 is the "brain" of the storage system 100, and mainly includes a processor 118, a communications interface 112, a memory 122, a communications bus (bus for short) 116, and a host bus adapter (HBA) 114. The processor 118, the communications interface 112, the memory 122, and the HBA 114 complete mutual communication using the communications bus 116.

The communications interface 112 may be a service access interface of the controller 105, and the controller 105 may communicate with external devices such as a host and a disk array 120 using the communications interface 112. For example, the controller 105 may receive an access request of a host for the disk array 120 using the communications interface 112.

The HBA 114 is a circuit board or an integrated circuit adapter that provides input/output (I/O) processing and a physical connection between the controller 100 and the disk array 120. It may be understood that, in actual application, the controller 100 may communicate with the disk array 120 using another communications interface device in addition to the HBA. For example, the controller 100 may communicate with the disk array 120 by directly using an Ethernet controller.

The memory 122 is configured to store a program 124. The memory 122 may include a high-speed random access memory (RAM), or may include a non-volatile memory. It may be understood that, the memory 122 may be various non-transitory machine-readable media that can store program code, such as RAM, a magnetic disk, a hard disk drive, a universal serial bus (USB) flash drive, a removable hard disk drive, an optical disc, a solid state disk (SSD), or another non-volatile memory.

The program 124 may include program code, and the program code includes a computer operation instruction.

The processor 118 may be a central processing unit (CPU), or an application specific integrated circuit (ASIC), or one or more integrated circuits that can implement this embodiment of the present disclosure. The processor 118 may implement different functions according to different software programs. For example, the processor 118 may process data in a hard disk drive 130 or control a state of the hard disk drive according to a service request of accessing the hard disk drive 130. In this embodiment of the present disclosure, the processor 118 is configured to execute the program 124, and may specifically perform related steps in the following method embodiments.

Although the controller 105 shown in FIG. 1 is located in the storage system 100, in some cases, the controller 105 may be located outside the storage system or located at a position far from the storage system. In addition, even though FIG. 1 provides merely an example of one controller 105, in actual application, there may be multiple controllers 105. For example, if there are multiple controllers 105, when one controller is faulty, another controller may take over work of the faulty controller, to control the disk array 120, and ensure normal work of the storage system 100.

The disk array 120 is configured to store data. The disk array 120 may include a redundant array of independent disks (RAID). In actual application, there may be multiple disk arrays 120. The disk array 120 may include multiple disk groups 125, and each disk group 125 includes multiple hard disk drives (HDD) 130. It should be noted that, the hard disk drive 130 is merely an example of a memory constructing the disk array 120. The memory in this embodiment of the present disclosure may include a solid state drive (SSD), or an apparatus, such as a cabinet or server constructed by multiple hard disk drives. This is not limited herein.

As shown in FIG. 1, the disk array 120 may be connected to the controller 105 using a bus interface. For example, the disk array 120 may be connected to the controller 105 using a SAS interface, a SCSI interface, or a SATA interface. This is not limited herein. In FIG. 1, a description is made using an example in which the disk array 120 is connected to the controller 105 using a SAS interface. Specifically, as shown in FIG. 1, the disk array 120 may include a serial attached SCSI (SAS) expander 126 and multiple hard disk drives 130. The HBA 114 in the controller 105 is connected to the SAS expander 126, and is connected to the multiple hard disk drives 130 using the SAS expander 126. A person skilled in the art may know that the SAS expander 126 includes multiple ports, and may be configured to expand a capacity of the disk array 120. For example, the SAS expander 126 may be an expander with 12 ports, 28 ports, or 36 ports. This is not limited herein. It may be understood that, the disk array 120 may include multiple SAS expanders 126, and the hard disk drives 130 in each disk group 125 may be connected using the SAS expander 126.

In this embodiment of the present disclosure, to facilitate management on the hard disk drives 130, the multiple hard disk drives 130 in the storage system 100 may be divided into multiple disk groups 125. One disk group 125 includes at least one hard disk drive 130. It should be noted that, when one disk group 125 includes multiple hard disk drives 130, resources of multiple hard disk drives 130 belonging to a same disk group 125 do not conflict. The resources in this embodiment of the present disclosure are factors that can affect normal work of the hard disk drive, such as power supply, heat dissipation, and vibration. For example, multiple hard disk drives 130 belonging to a same disk group 125 may work simultaneously, and multiple hard disk drives 130 belonging to a same disk group 125 may be simultaneously powered on or powered off. In this embodiment of the present disclosure, the hard disk drive 130 is scheduled in a unit of a disk group 125. One service request may be processed by one or more hard disk drives 130 in one disk group 125. For example, multiple hard disk drives 130 in a disk group 125 may construct a redundant array of independent disks (RAID), and the multiple hard disk drives 130 in the disk group 125 can simultaneously read data blocks in one stripe according to a received service request. A person skilled in the art may know that, the stripe described in this embodiment of the present disclosure is a set of data blocks that are written in parallel into hard disk drives 130 that construct the RAID. Sizes of the data blocks in the stripe are the same, and data blocks in a stripe are located in a same offset position in each memory. The data blocks in the stripe may also be referred to as strips, and the strips are consecutive address blocks on one extent. It should be noted that, in this embodiment of the present disclosure, one service request is not processed by multiple disk groups 125 cooperatively. In this embodiment of the present disclosure, the service request may include a read request and a write request for data stored in the storage system 100.

The power supply system 110 may supply power to the controller 105 and the disk array 120. The heat dissipation system 115 may dissipate heat for the controller 105 and the disk array 120. Specifically, the power supply system 110 may include one or more power modules. The heat dissipation system 115 may dissipate heat for the hard disk drive 130 and the controller 105 using a device such as an air conditioning system or a fan. Specific types of the power supply system 110 and the heat dissipation system 115 are not limited herein. In the storage system 100 shown in FIG. 1, an example in which the controller 105 and the disk array 120 share one power supply system 110 and one heat dissipation system 115 is used. In actual application, the controller 105 and the disk array 120 may use different power supply systems and heat dissipation systems. This is not limited herein.

Figure 2:
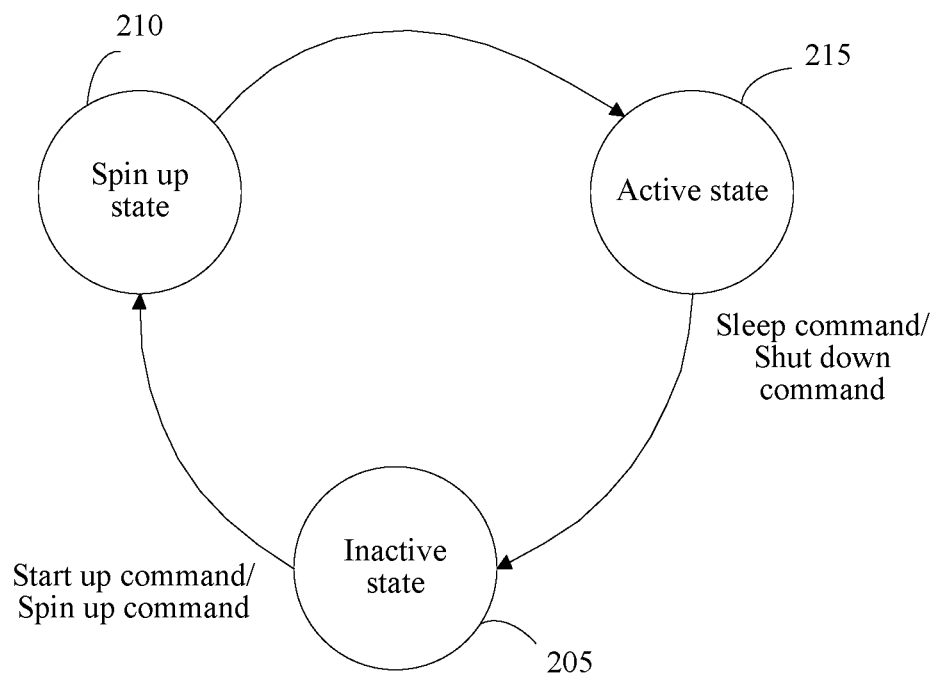
FIG. 2 is a schematic diagram of a hard disk drive status according to an embodiment of the present disclosure.

As shown in FIG. 2, in this embodiment of the present disclosure, according to a requirement of the hard disk drive 130 on power supplied by the power supply system 110, a status of the hard disk drive 130 may be divided into the following three main states: an inactive state 205, a spin up state 210, and an active state 215. The inactive state 205 may include a state in which the hard disk drive 130 is powered off (power off) or the hard disk drive 130 is powered on (power on) but a platter of the hard disk drive 130 does not spin. In other words, the inactive state 205 is a state in which a platter of the hard disk drive does not spin. In this embodiment of the present disclosure, the state in which the hard disk drive 130 is powered on (power on) but the platter of the hard disk drive 130 does not spin may include a standby state or a sleep state. In the inactive state, because the platter of the hard disk drive 130 does not spin, power of the hard disk drive 130 is very small or the hard disk drive 130 consumes no power. After the hard disk drive 130 in the inactive state receives a spin up command (or a start up command), a platter of the hard disk drive 130 starts to spin, and the hard disk drive 130 enters the spin up state. The spin up state is a state of the hard disk drive 130 during a period from a time point at which the hard disk drive is powered on to a time point at which a spin speed of the platter of the hard disk drive 130 reaches a fixed spin speed required for processing data. Processing data includes reading data and writing data. In other words, the spin up state is a state of the hard disk drive 130 in an initialization process. In this process, the platter of the hard disk drive 130 switches from not spinning to spinning at the fixed spin speed, and the hard disk drive 130 completes preparation work for reading data and writing data. When the hard disk drive 130 is in the spin up state, power of the hard disk drive 130 is relatively large. Generally, the hard disk drive 130 is in the spin up state for approximately 15 s. Specific duration of the spin up state is related to design of the hard disk drive 130. This is not limited in this embodiment of the present disclosure. After the spin up state 210, the hard disk drive 130 may enter the active state 215. The active state 215 is a state in which a platter of the hard disk drive 130 is in a spinning state and a spin speed reaches a fixed spin speed required for processing data. Specifically, the active state may include a state in which the platter of the hard disk drive 130 spins and data is being read/written and a state in which the spin speed of the platter reaches the fixed spin speed required for processing data and no data is read/written. After receiving a sleep command or a shut down command, the hard disk drive 130 in the active state 215 may stop working, and enters the inactive state. In the foregoing three states of the hard disk drive 130, power of the hard disk drive 130 in the inactive state is minimum, and power of the hard disk drive 130 in the active state is less than power of the hard disk drive 130 in the spin up state. Generally, power of the hard disk drive in the spin up state is three times the power of the hard disk drive in the active state.

It should be noted that, as a solution to cold storage, because data stored in the storage system 100 is rarely accessed, to reduce system power, in the storage system 100 provided in this embodiment of the present disclosure, the power supply system 110 and the heat dissipation system 115 do not allow all hard disk drives 130 in the storage system 100 to be simultaneously in the active state or the spin up state. In other words, the power supply system 110 and the heat dissipation system 115 may allow only some hard disk drives 130 in the storage system 100 to be simultaneously in the active state or the spin up state. If all hard disk drives 130 in the storage system 100 are simultaneously in the active state or the spin up state, the storage system 100 may be faulty. In addition, to reduce an access delay of the storage system in a data access process as much as possible while reducing system power of the storage system 100, this embodiment of the present disclosure provides a scheduling mechanism. By means of this scheduling mechanism, the storage system 100 is controlled, so that while some disk groups 125 are in the active state, some other disk groups are in the spin up state. The disk groups in the active state and the disk groups in the spin up state are only some disk groups in the storage system 100. For example, by means of this scheduling mechanism, a first disk group in the storage system 100 may be in the active state, and meanwhile a second disk group may be in the spin up state. Using this manner, preparation can be made for the second disk group for processing services subsequently, a waiting time length for spinning up the second disk group is reduced, and a delay for processing services by the system is shortened. It may be understood that, this scheduling mechanism may run on the controller 105 in a software form. In this embodiment of the present disclosure, the storage system 100 may be further controlled using the power supply system 110 and the heat dissipation system 115, so that while some disk groups 125 are in the active state, some other disk groups are in the spin up state. For example, in a case, it may be designed that the power supply system 110 can supply only power that allows some disk groups 125 to be simultaneously in the active state and some other disk groups 125 to be simultaneously in the spin up state. The some disk groups in the active state and the some other disk groups in the spin up state are only some disk groups in the storage system 100. In another case, the power supply system 110 may have a sufficient power supply capability to make all disk groups in the storage system be simultaneously in the active state. However, during working, the power supply system 100 supplies only power that allows some disk groups 125 to be simultaneously in the active state and some other disk groups 125 to be simultaneously in the spin up state. A maximum power supply capability of the power supply system 100 is not limited in this embodiment of the present disclosure. Hard disk drive scheduling methods provided in the embodiments of the present disclosure are described below in detail with reference to the accompanying drawings.

Figure 3:
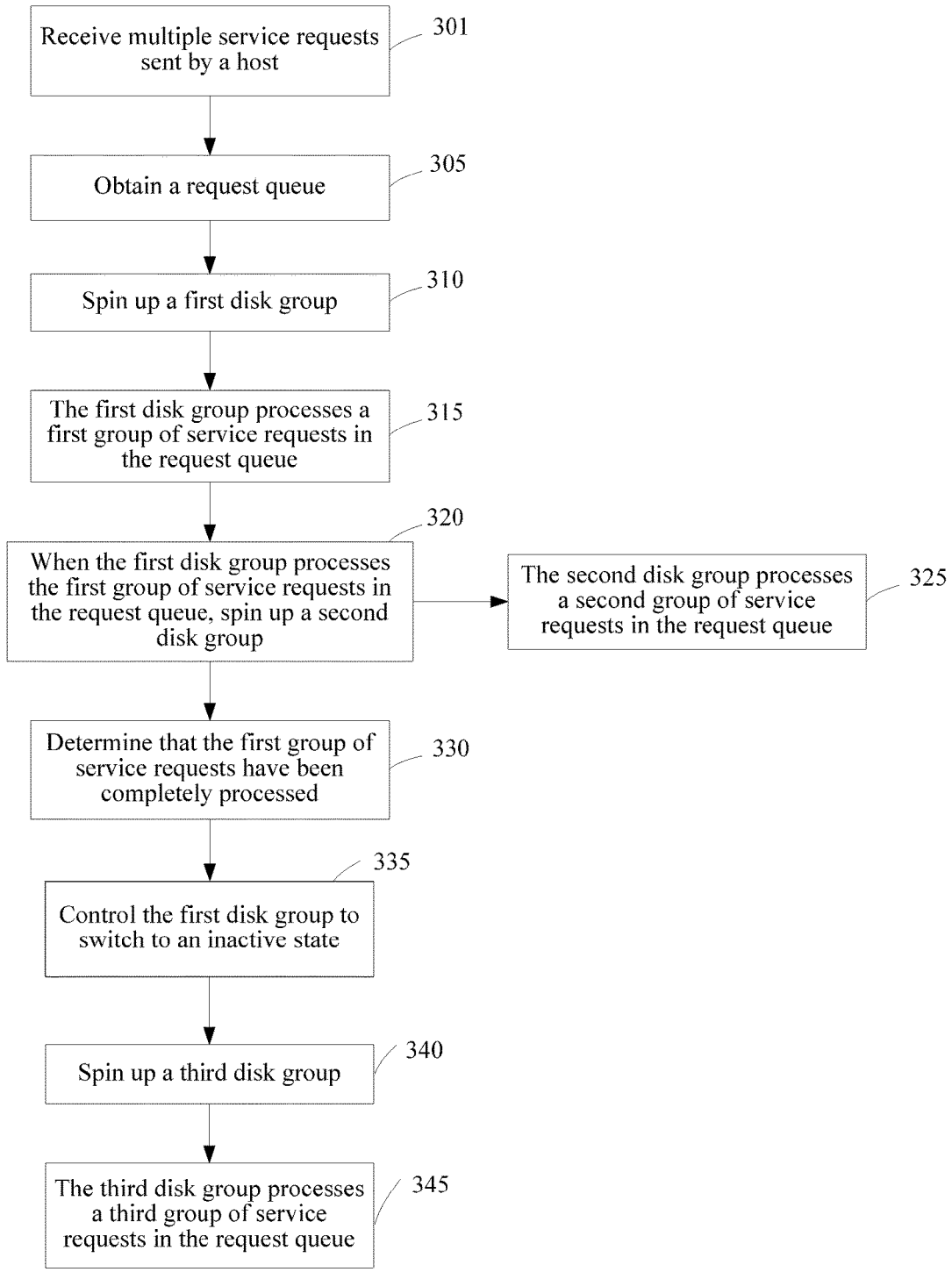
FIG. 3 is a flowchart of a hard disk drive scheduling method according to an embodiment of the present disclosure.

An embodiment of the present disclosure provides a hard disk drive scheduling method shown in FIG. 3. The method may be implemented by the storage system shown in FIG. 1. For clear description, in FIG. 3, a storage system including three disk groups is used as an example to describe the hard disk drive scheduling method provided in this embodiment of the present disclosure. In this embodiment of the present disclosure, an example in which three disk groups include a same quantity of hard disk drives is used. In other words, in the storage system shown in FIG. 3, power of each disk group in an active state is the same, and power of each disk group in a spin up state is also the same. As shown in FIG. 3, the method may specifically include the following steps.

In step 301, a controller 105 receives multiple service requests sent by a host. In this embodiment of the present disclosure, a service request may include a read request of reading data from the disk array 120, or may include a write request of writing data to the disk array 120. This is not limited herein. A person skilled in the art may know that, the service request carries a to-be-accessed address, and the storage system 100 may determine, according to received service requests, a disk group to be accessed by each service request. In this embodiment of the present disclosure, one service request is processed by one disk group, and one disk group may process multiple service requests. It should be noted that, the host is merely an example of a communications device that needs to access the storage system and that has a calculation function. In this embodiment of the present disclosure, the storage system 100 may further receive a service request of a communications device such as a server or a terminal using a network device. This is not limited herein.

Figure 4:
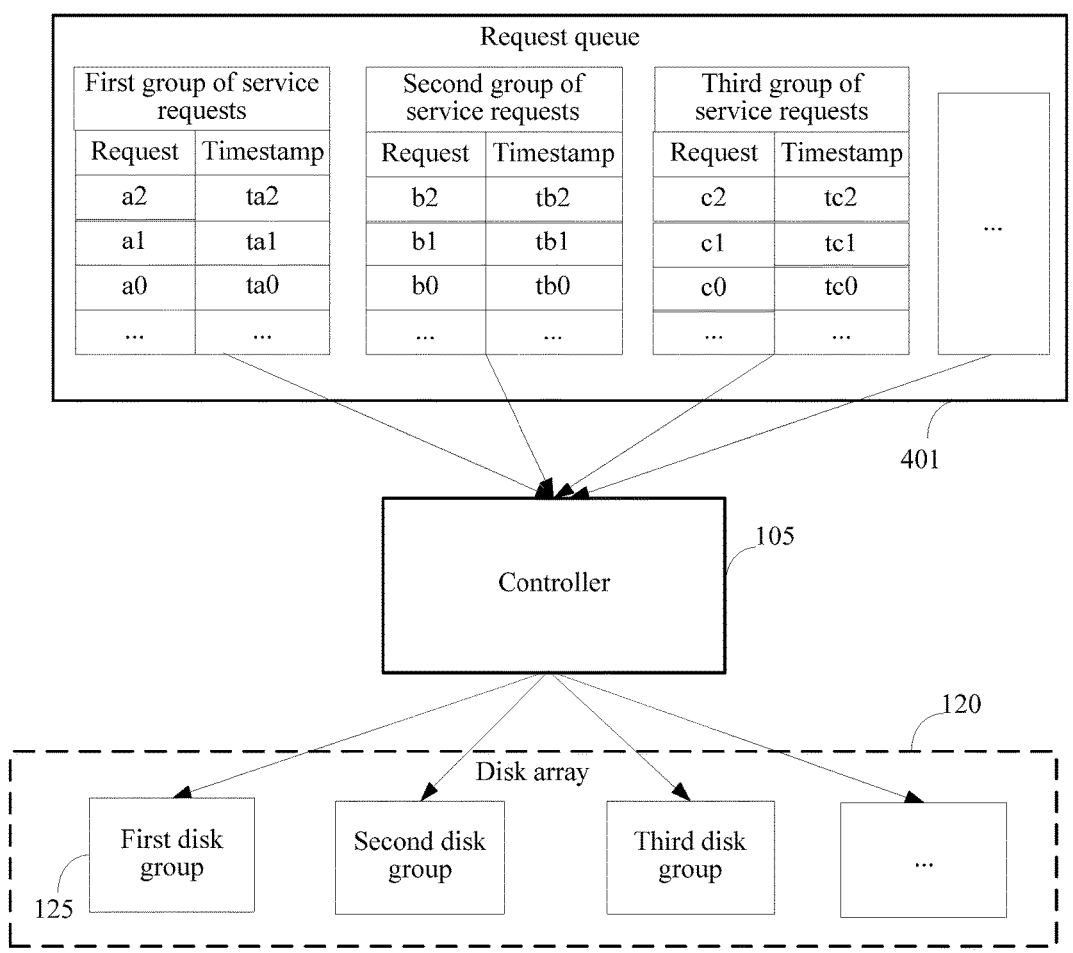
FIG. 4 is a schematic diagram of service scheduling according to an embodiment of the present disclosure.

In step 305, the controller 105 may obtain a request queue according to a processing sequence of the received service requests. The request queue includes at least a service request and a timestamp, and the timestamp is used to record a time point at which a service request enters the request queue. A person skilled in the art may understand that, when a request queue is being established, the request queue may be established for each disk group according to the disk group accessed by the service request, or one request queue may be established for all disk groups. This is not limited in this embodiment of the present disclosure. For example, FIG. 4 is a schematic diagram of service scheduling according to an embodiment of the present disclosure. As shown in FIG. 4, the controller 105 may sort multiple service requests received in a preset time period, to obtain a request queue 401. For example, the controller 105 may obtain a request queue by sorting service requests received every two minutes. When obtaining the request queue, the controller 105 may group the service requests within the preset time period according to a preset time window and different accessed disk groups, to obtain multiple groups of service requests that are separately processed by different disk groups. Each of the multiple groups of service requests includes at least one service request. For example, the controller 105 may group, using every 20 s as one time window, received service requests according to a sequence of receiving service requests for accessing a first disk group within two minutes, to obtain one or more groups of service requests for accessing the first disk group within the two minutes. Similarly, the controller may also group, according to a sequence of receiving service requests for accessing a second disk group within two minutes, service requests received in every 20 s, to obtain one or more groups of service requests for accessing the second disk group within the two minutes. According to the method for grouping service requests, multiple groups of service requests for accessing disk groups in the preset time period may be obtained. For example, in FIG. 4, a0, a1, and a2 are separately used to represent a first group of service requests for accessing the first disk group, b0, b1, and b2 are separately used to represent a second group of service requests for accessing the second disk group, and c0, c1, and c2 are separately used to represent a third group of service requests for accessing a third disk group. ta0 is used to represent a time point at which the service request a0 enters the request queue 401. Timestamps such as ta1 and ta2 are separately used to represent a time point at which a corresponding service request enters the request queue 401. It may be understood that, using the manner for grouping service requests in the preset time period, a disk group in an active state can process as many service requests as possible.

After obtaining the multiple groups of service requests processed by different disk groups, the controller 105 may sort the groups of service requests in a unit of a group of service requests, to determine a processing sequence of the groups of service requests. For example, the controller 105 may sort the groups of service requests according to a sequence of receiving time points or priorities of the groups of service requests. Certainly, the controller 105 may further sort the groups of service requests in another manner. The method for obtaining the request queue 401 is not limited in this embodiment of the present disclosure. After obtaining the request queue 401, the controller 105 may separately process service requests according to a processing sequence of groups of service requests in the request queue 401, to write data to different disk groups 125 or read data from different disk groups 125 according to the groups of service requests. For example, the controller 105 may separately read data from the first disk group or write data to the first disk group according to one or more service requests in the first group of service requests.

Figure 5:
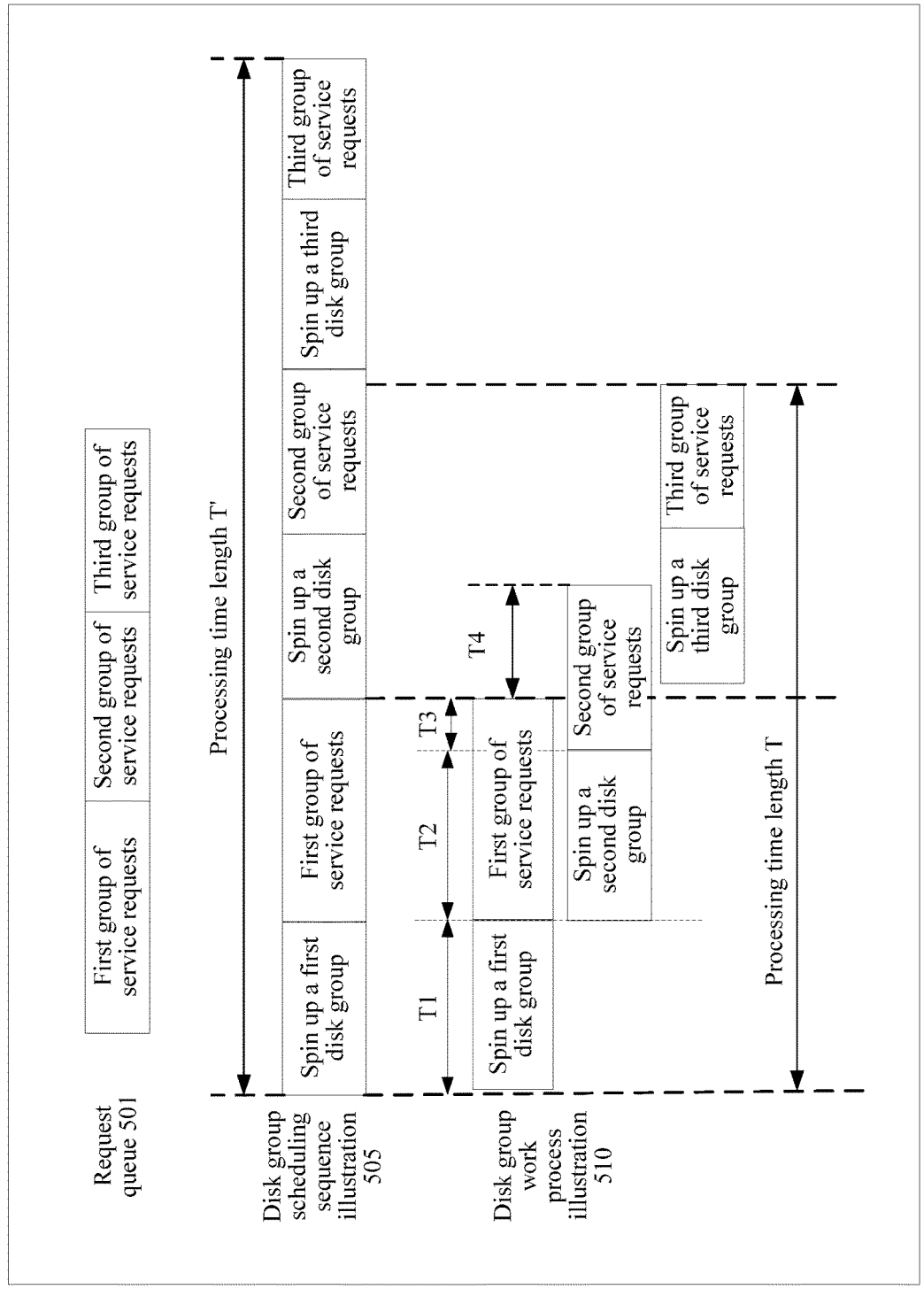
FIG. 5 is a schematic diagram of a hard disk drive scheduling method according to an embodiment of the present disclosure.

In step 310, the controller 105 spins up a first disk group. For clear description, the hard disk drive scheduling method provided in this embodiment of the present disclosure shown in FIG. 3 is described below with reference to FIG. 5. FIG. 5 is a schematic diagram of a hard disk drive scheduling method according to an embodiment of the present disclosure. In FIG. 5, illustration is made using an example in which the storage system 100 including three disk groups processes three groups of service requests. As shown in FIG. 5, the controller 105 divides multiple service requests received in a preset time period into three groups, and sorts the three groups of service requests according to a priority sequence to obtain a request queue 501. In this embodiment of the present disclosure, a description is made using an example in which the first disk group in the storage system 100 processes a first group of service requests, the second disk group processes a second group of service requests, and the third disk group processes a third group of service requests. In the request queue 501, a processing sequence of the first group of service requests is prior to a processing sequence of the second group of service requests, and the processing sequence of the second group of service requests is prior to a processing sequence of the third group of service requests. After obtaining the request queue 501, in step 310, the controller 105 may determine, according to the request queue 501, that the first group of service requests need to be processed first. Therefore, the controller 105 may first spin up the first disk group. As shown in FIG. 5, in a time period T1, the first disk group is in the spin up state.

In step 315, the first disk group processes a first group of service requests in the request queue. Specifically, after the first disk group is completely spun up, the first disk group enters the active state. For example, a hard disk drive in the first disk group may separately read data or write data according to each service request in the first group of service requests. In actual application, one hard disk drive in the first disk group may be accessed according to the first group of service requests, or multiple hard disk drives in the first disk group may be accessed according to the first group of service requests.

In step 320, when the first disk group processes the first group of service requests, the controller 105 spins up a second disk group. In the storage system 100 provided in this embodiment of the present disclosure, the power supply system 110 can meet power required for one disk group being in the active state and another disk group being in the spin up state, and a heat dissipation system 115 can also meet a heat dissipation capability required for one disk group being in the active state and another disk group being in the spin up state. In other words, in the storage system 100 provided in this embodiment of the present disclosure, various hardware conditions of the storage system 100 can meet that one disk group is in the spin up state while another disk group is processing service requests, but cannot meet that three disk groups in the storage system 100 are simultaneously in the active state or in the spin up state. In this case, compared with a case in which three disk group are simultaneously spun up, the storage system 100 in this embodiment of the present disclosure can reduce more power, and at least two disk groups in the storage system 100 may process service requests in parallel, thereby reducing a service processing time length to some extent. Therefore, in step 320, as shown in FIG. 5, when the first disk group enters the active state and starts to process the first group of service requests, the controller 105 may control the second disk group to be in the spin up state. Alternatively, in other words, when the first disk group starts to process the first group of service requests, the controller 105 may spin up the second disk group. It may be learned from FIG. 5 that, in a time period T2, the first disk group is in the active state and the second disk group is in the spin up state.

In step 325, the second disk group processes a second group of service requests in the request queue. Similar to step 315, after the second disk group is completely spun up, the second disk group starts to enter the active state. After entering the active state, the second disk group starts to process the second group of service requests in the request queue 501. As shown in FIG. 5, in a time period T3, the first disk group and the second disk group simultaneously process service requests. It may be understood that, because power required for spinning up the disk group 125 is greater than power of the disk group 125 in the active state, the storage system 100 can allow the first disk group and the second disk group to be simultaneously in the active state.

In step 330, the controller 105 determines that the first group of service requests have been completely processed. In a case, after completely processing the first group of service requests, the first disk group may notify the controller 105. For example, the first disk group may actively send, to the controller 105, a message indicating that the first group of service requests have been completely processed. In another case, the controller 105 may detect whether the first group of service requests have been completely processed. For example, the controller 105 may send a query message to the first disk group to determine a processing progress of the first group of service requests.

In step 335, the controller 105 controls the first disk group to switch from an active state to an inactive state. Specifically, when the first disk group completely processes the first group of service requests, the controller 105 switches the first disk group from the active state to the inactive state. For example, at an end moment of the time period T3 shown in FIG. 5, the controller 105 may send a sleep command or a shut down command to a hard disk drive in the first disk group, and instruct the hard disk drive in the first disk group to switch from the active state to the inactive state. A person skilled in the art may know that, because power of the hard disk drive 130 in the inactive state is minimum, after the disk group is switched from the active state to the inactive state, the disk group releases a part of power.

In step 340, the controller 105 spins up a third disk group. In step 335, after controlling the first disk group to switch from the active state to the inactive state, the controller 105 releases a part of power. Therefore, in this step, the controller 105 may spin up another disk group. For example, at a start moment of a time period T4 shown in FIG. 5, the controller 105 may send a start up command or a spin up command to the third disk group in the storage system 100, to spin up the third disk group. In the storage system 100 shown in this embodiment of the present disclosure, because various hard disk drive conditions can allow one disk group to be in the spin up state while another disk group is in the active state, in the time period T4 shown in FIG. 5, the storage system 100 can allow the second disk group to be in the active state and the third disk group to be in the spin up state.

In step 345, the third disk group processes a third group of service requests in the request queue. After the third disk group is completely spun up, the third disk group is in the active state, and a hard disk drive in the third disk group can process the third group of service requests in the request queue 501.

An existing storage system generally sequentially spins up different disk groups according to a processing sequence of service requests, to process corresponding service requests. For example, a storage system in the prior art may separately schedule, according to a scheduling sequence shown in disk group scheduling sequence illustration 505 shown in FIG. 5, different disk groups to process service requests, causing a relatively long processing time length T' of the service requests in the storage system 100. In this embodiment of the present disclosure, it may be seen from disk group work process illustration 510 shown in FIG. 5 that, to reduce system power, although the storage system provided in this embodiment of the present disclosure cannot meet that all disk groups are simultaneously in the active state or the spin up state either, the storage system provided in this embodiment of the present disclosure can allow that hard disk drives in some disk groups are in the spin up state while hard disk drives in some other disk groups are in the active state. A storage system 100 including three disk groups provided in this embodiment is used as an example. According to the hard disk drive scheduling method provided in this embodiment of the present disclosure, two disk groups can be in the active state in parallel, thereby reducing a system waiting time length when the second disk group and the third disk group are spun up, and reducing a time length for processing service requests. For example, as shown in the disk group work process illustration 510 in FIG. 5, when same service requests are being processed, after the storage system and the hard disk drive scheduling method provided in this embodiment of the present disclosure are used, a value of a processing time length T of service requests is less than a value of T'. Therefore, using the storage system and the hard disk drive scheduling method provided in this embodiment of the present disclosure can reduce a time length for processing service requests, shorten a delay for processing service requests by the storage system, and improve service processing efficiency of the storage system.

Figure 6:
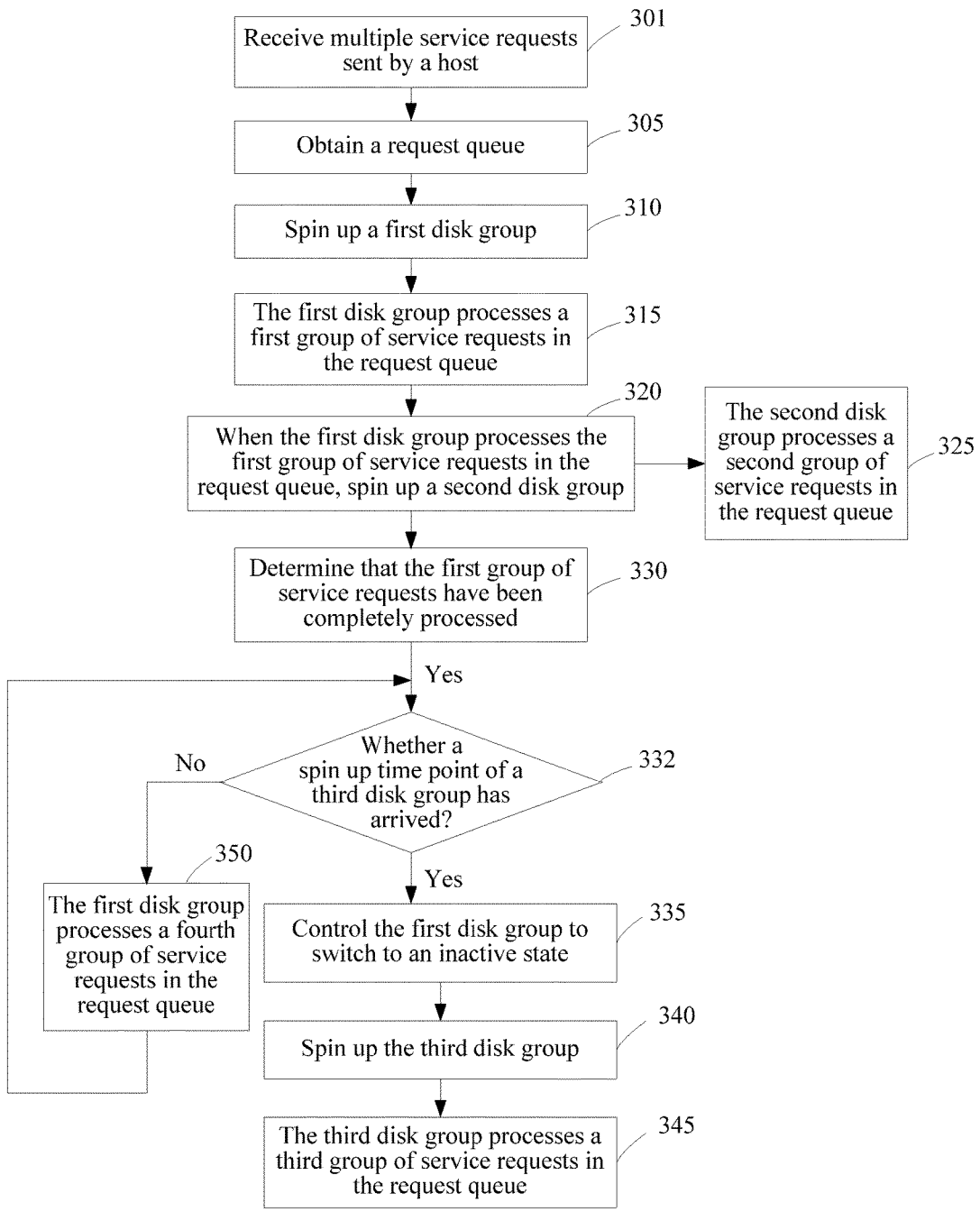
FIG. 6 is a flowchart of another hard disk drive scheduling method according to an embodiment of the present disclosure.

In another case, to reduce a quantity of spin-up times of the disk group based on the embodiment shown in FIG. 3, and further shorten a service processing time length, an embodiment of the present disclosure further provides another hard disk drive scheduling method. Another hard disk drive scheduling method shown in FIG. 6 is described in detail below with reference to FIG. 3 and FIG. 7. For clear description, in the embodiment shown in FIG. 6, a description is made using an example in which a storage system 100 including three disk groups processes at least four groups of service requests.

For step 301 to step 330, refer to the description of related steps in the embodiment of FIG. 3. Different from the embodiment shown in FIG. 3, in the embodiment shown in FIG. 6, in step 305, for a request queue obtained by the controller 105, refer to a request queue 701 shown in FIG. 7. The request queue 701 shown in FIG. 7 includes at least five groups of service requests. In this embodiment of the present disclosure, a description is made using an example in which the first disk group processes a first group of service requests and a fourth group of service requests, the second disk group processes a second group of service requests and a fifth group of service requests, and the third disk group processes a third group of service requests.

In step 332, the controller 105 determines whether a spin up time point of the third disk group has arrived. In this embodiment of the present disclosure, in step 330, after the first disk group completely processes the first group of service requests, the controller 105 may further determine whether the spin up time point of the third disk group has arrived, that is, the controller 105 may further determine whether the third disk group needs to be spun up. A person skilled in the art may know that, after sorting to-be-processed service requests to obtain the request queue 701, the controller 105 may obtain, according to spin up duration of each disk group and an execution time length of each service request, a latest spin up time point of each disk group that processes each group of service requests. In this embodiment of the present disclosure, an execution time length of a service request is a time length required for executing the service request, and spin up duration of a disk group is a time length required by the disk group from starting to be spun up to being completely spun up, that is, a time length required for completing initialization preparation work by the disk group. For example, the controller 105 may obtain, according to the spin up duration of the disk group and the execution time length of each service request in the request queue 701, the latest spin up time point of each disk group through a calculation. An example in which spin up duration of one disk group is 20 s, an execution time length of the first group of service requests is 20 s, and an execution time length of the second group of service requests is 30 s is used. It may be obtained that a latest spin up time point of the second disk group for processing the second group of service requests is 40 s later after the first disk group for processing the first group of service requests is spun up, and a latest spin up time point of the third disk group for processing the third group of service requests is 90 s later after the first disk group starts to be spun up. A person skilled in the art may understand that, when a latest spin up time point of a disk group has arrived, the disk group needs to be spun up; if the disk group is not spun up, the disk group delays processing of service requests, causing disorder between services. In this embodiment of the present disclosure, a latest spin up time point of a disk group is also referred to as a spin up time point of the disk group. As shown in disk group scheduling sequence illustration 705 in FIG. 7, the latest spin up time point of the second disk group for processing the second group of service requests may be shown as t1, and the latest spin up time point of the third disk group for processing the third group of service requests may be shown as t2. The first disk group for processing the fourth group of service requests should be spun up at the moment t3 at the latest. It may be understood that, in actual application, the spin up time point may be one time period. In this step, if the controller 105 determines that the spin up time point of the third disk group has arrived, the method enters step 335; if the spin up time point of the third disk group has not arrived, the method enters step 350.

In step 335, the controller 105 may control the first disk group to switch to an inactive state. In step 340, the controller 105 spins up a third disk group. In step 345, the third disk group processes a third group of service requests in the request queue 701. For a specific description of step 335 to step 345, refer to the related description of the embodiment shown in FIG. 3. Details are not described herein again.

In step 350, the first disk group processes a fourth group of service requests in the request queue. In this embodiment of the present disclosure, to further reduce power of the storage system, if in step 332, the controller 105 determines that when the first disk group completely processes the first group of service requests, the spin up time point of the third disk group has not arrived, the first disk group may continue to process the fourth group of service requests in the request queue 701. For example, as shown in disk group work process illustration 710 in FIG. 7, a time point at which the first disk group completely processes the first group of service requests is a moment t1, and the spin up time point of the third disk group may be a moment t2. Therefore, after completely processing the first group of service requests, the first disk group may continue to process the fourth group of service requests that need to be processed by the first disk group. If the spin up time point of the third disk group has still not arrived after the first disk group completely processes the fourth group of service requests, the first disk group may continue to process a service request A that needs to be processed by the first disk group in the request queue 701 until the spin up time point of the third disk group has arrived. In this embodiment of the present disclosure, the service request A is used to represent one or more groups of service requests whose processing sequence in the request queue 701 is after that of the fourth group of service requests and that should be processed by the first disk group. In other words, in this embodiment of the present disclosure, after the first disk group completely processes the first group of service requests, if the spin up time point of the third disk group has not arrived, the first disk group may continue to process other service requests that need to be processed by the first disk group in the request queue 701, until the spin up time point of the third disk group has arrived. The other service requests that need to be processed by the first disk group in the request queue 701 may also be referred to as service requests to be processed by the first disk group in the request queue 701. ☐When the third disk group needs to be spun up, the method may enter step 335, and the controller 105 controls the hard disk drive in the first disk group to switch from the active state to the inactive state, and then spins up the third disk group.

Figure 7:
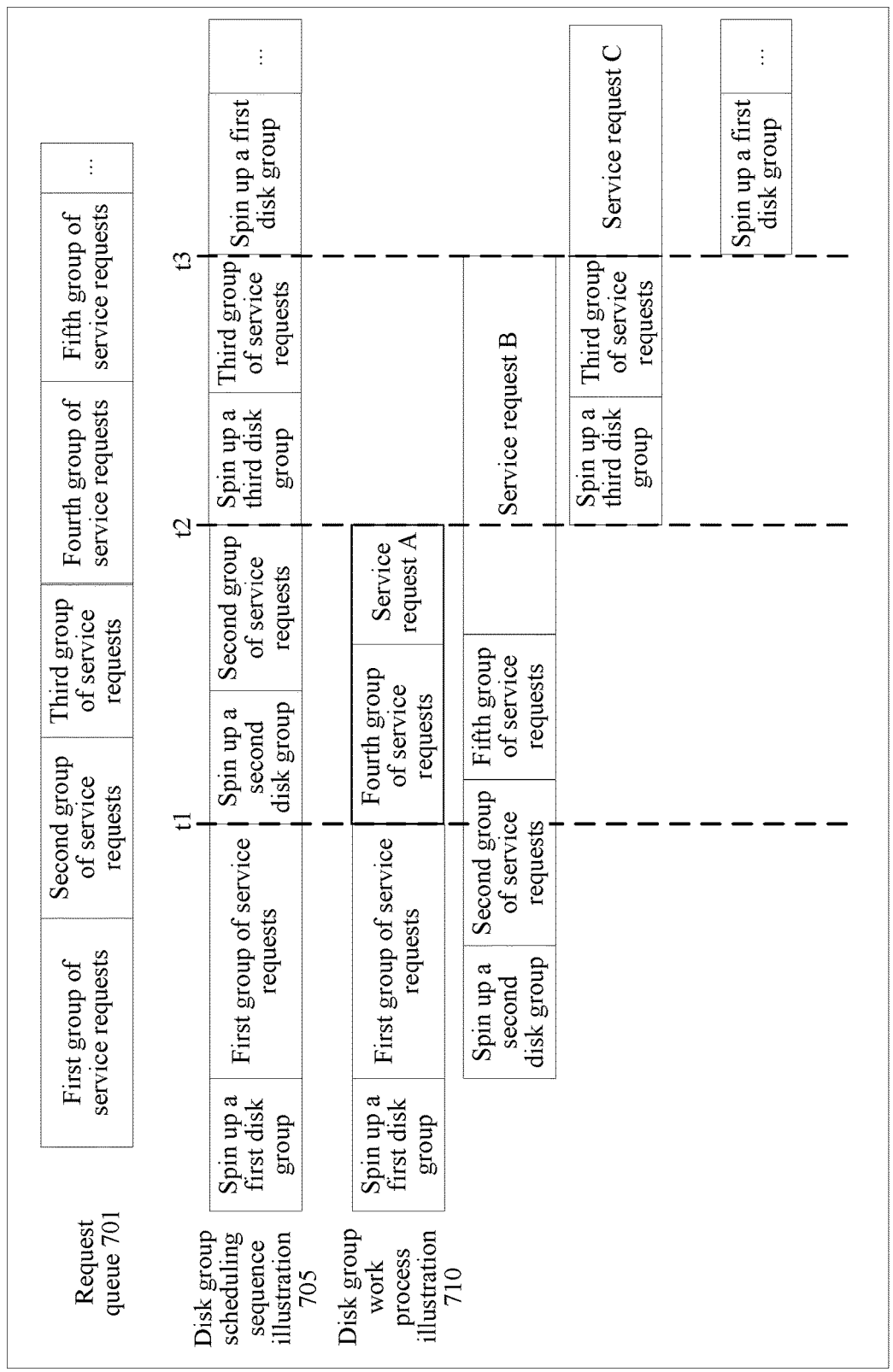
FIG. 7 is a schematic diagram of another hard disk drive scheduling method according to an embodiment of the present disclosure.

Similarly, as shown in FIG. 7, after the second disk group completely processes the second group of service requests, because a time point t3 for spinning up the first disk group again has not arrived, similar to the first disk group described in step 350, the second disk group may continue to process the fifth group of service requests in the request queue 701 and a service request B. The service request B is used to represent one or more groups of service requests whose processing sequence in the request queue 701 is after that of the fifth group of service requests and that should be processed by the second disk group. When the spin up time point t3 of the first disk group has arrived, the controller 105 controls the second disk group to switch from the active state to the inactive state, and then spins up the first disk group. According to this manner, starting from the moment t3, the controller 105 may alternately schedule each disk group according to a current processing sequence of service requests that are not processed in the request queue 701 and according to the hard disk drive scheduling method provided in this embodiment of the present disclosure, to process the service requests that are not processed. A person skilled in the art may understand that, in this embodiment of the present disclosure, because subsequent service requests in the request queue 701 may be processed in advance, the controller 105 may sort again the service requests that are not processed in the request queue 701, and then schedule each disk group according to the request queue obtained by performing sorting again and according to the method provided above, to process the service requests that are not processed.

It should be noted that, the fourth group of service requests described in step 350 is merely an example of subsequent service requests that need to be processed by the first disk group. In actual application, in a case, after the first disk group completely processes the first group of service requests, if the spin up time point of the third disk group has not arrived, the first disk group may continue to process one or more groups of service requests that are not processed and that need to be processed by the first disk group in the request queue. In another case, a time length for processing the second group of service requests may be shorter than a time length for processing the first group of service requests, and the second group of service requests are first processed completely. In this case, if the spin up time point of the third disk group has not arrived after the second group of service requests have been completely processed, the second disk group may continue to process one or more groups of service requests that are not processed and that need to be processed by the second disk group. In another case, if the spin up time point of the third disk group has not arrived when both the first group of service requests and the second group of service requests are completely processed, both the first disk group and the second disk group may separately continue to process one or more groups of service requests that are not processed and that need to be processed by the first disk group and the second disk group in the request queue, until the spin up time point of the third disk group has arrived. It may be understood that, in this embodiment of the present disclosure, the fourth group of service requests, the fifth group of service requests, the service request A, and the service request B are merely examples for ease of description. In actual application, after either of a first group of service request and a second group of service request are completely processed, a disk group that has completely processed the service requests may continue to process the $F^{th}$ group of service requests in the request queue. The $F^{th}$ group of service requests are located after the third group of service requests in the request queue, and the $F^{th}$ group of service requests are any service requests that are not processed by the disk group that has completely processed the service requests.

The foregoing hard disk drive scheduling method is merely an example. In actual application, when the third disk group needs to be spun up, if service requests in the second disk group have been completely processed, the hard disk drive in the first disk group may not be switched to the inactive state, the hard disk drive in the second disk group is switched to the inactive state instead, and then the third disk group is spun up. In other words, when the third disk group needs to be spun up, the hard disk drive in the first disk group or the hard disk drive in the second disk group may be selected to be closed. In actual application, when a disk group is selected to be closed, a disk group running for a longer time length of disk groups that are currently in the active state may be selected to be closed, or a disk group with fewer high-priority service requests of disk groups that are currently in the active state or a disk group without high-priority service requests may be selected to be closed. This is not limited in this embodiment of the present disclosure.

It may be learned according to the embodiment shown in FIG. 6 and FIG. 7 that, based on the embodiment shown in FIG. 3, in the embodiment shown in FIG. 6, according to the manner in which after it is determined that a spin up time point of a next disk group has not arrived, subsequent service requests for a disk group that has completely processed current service requests are processed in advance, a disk group that has been spun up can process as many service requests as possible. In a case of processing same service requests, compared with the embodiment shown in FIG. 3, in the hard disk drive scheduling method provided in this embodiment of the present disclosure, while a system waiting time length is reduced when the disk group is spun up and a service processing delay is shortened, a quantity of spin-up times of the disk group is reduced, an average delay for processing multiple service requests is reduced, and average power of the storage system is reduced.

It should be noted that, although in the hard disk drive scheduling methods provided in FIG. 3 and FIG. 6, a storage system including three disk groups is used as an example for description, in actual application, the storage system 100 may include more than three disk groups. When the storage system includes more than three disk groups, the hard disk drive scheduling methods shown in FIG. 3 and FIG. 6 may still be applied to scheduling of the disk groups in the storage system. In actual application, multiple disk groups may be simultaneously scheduled to simultaneously process multiple groups of service requests. The following describes, with reference to a flowchart of another hard disk drive scheduling method shown in FIG. 8, the case of simultaneously scheduling multiple disk groups.

Figure 8:
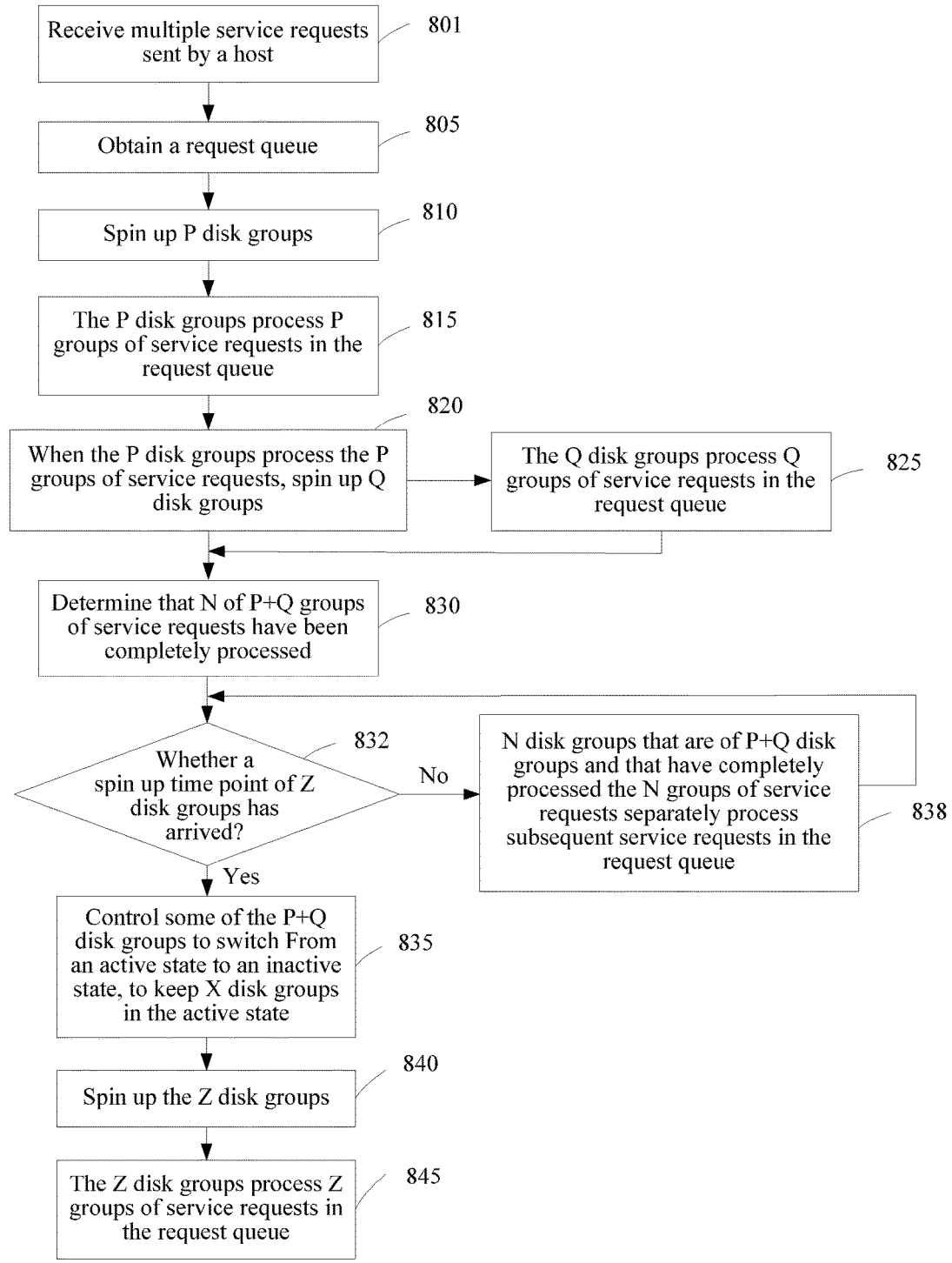
FIG. 8 is a flowchart of another hard disk drive scheduling method according to an embodiment of the present disclosure.

FIG. 8 shows another hard disk drive scheduling method according to an embodiment of the present disclosure. In the embodiment shown in FIG. 8, a storage system 100 including M (M is a natural number not less than 4) disk groups is used as an example for description. In this embodiment of the present disclosure, a power supply system in the storage system 100 can simultaneously supply sufficient power to X+Y of M disk groups. Hard disk drives in X disk groups are in an active state, hard disk drives in Y disk groups are in a spin up state, both X and Y are natural numbers, and X+Y is not less than 3 and less than M. Values of both X and Y may be preset. A person skilled in the art may understand that, smaller values of X and Y indicate that more system power is reduced, but larger values of X and Y indicate that a longer service processing time length is reduced. In actual application, the values of X and Y may be set with reference to a hardware condition of the storage system 100 and a requirement for a service processing delay. The following describes, with reference to a schematic diagram of hard disk drive scheduling provided in FIG. 9A and FIG. 9B, the hard disk drive scheduling method provided in FIG. 8. As shown in FIG. 8, the method may include the following steps.

In step 801, a controller 105 may receive multiple groups of service requests sent by a host. In step 805, the controller 105 may obtain a request queue 901. For a description of step 801 and step 805, refer to the related description of step 301 and step 305 in FIG. 3. The request queue 901 shown in FIG. 9A and FIG. 9B includes multiple groups of service requests that are sorted according to a processing sequence. In actual application, because the service request carries a to-be-accessed address, the controller 105 may learn, according to the service request, of a disk group that needs to process the service request.

In step 810, the controller 105 spins up P disk groups. Specifically, in the storage system shown in this embodiment of the present disclosure, the storage system 100 includes M disk groups. Therefore, the controller may spin up P of the M disk groups according to a processing sequence of service requests in the request queue 901. P is a natural number not less than 1 and not greater than X. For example, the controller 105 may spin up, according to the first group of service requests to the $P^{th}$ group of service requests in the request queue 901, P disk groups used to process the P groups of service requests. It may be understood that, a value of P may be specifically determined according to a quantity of service requests in the request queue and a value of X. For example, when the quantity of service requests in the request queue is greater than the value of X, the value of P may be equal to the value of X; when the quantity of service requests in the request queue is less than the value of X, the value of P can be only less than the value of X.

In step 815, the P disk groups process P groups of service requests in the request queue. In this embodiment of the present disclosure, at any moment, one disk group can process only one group of service requests. In this embodiment of the present disclosure, when the value of P is not less than 2, the P disk groups may process the P groups of service requests in the request queue in parallel. For example, as shown in disk group scheduling sequence illustration 905 in FIG. 9A and FIG. 9B, the first disk group processes the first group of service requests, the $P^{th}$ disk group processes the $P^{th}$ group of service requests, and so on.

In step 820, when the P disk groups process the P groups of service requests, the controller 105 spins up Q disk groups. That is, when the P disk groups process the P groups of service requests, the controller 105 controls the Q disk groups to switch from an inactive state to the spin up state. Q is a natural number not less than 1 and not greater than Y. It may be understood that, a value of Q may also be determined according to a quantity of service requests in the request queue and a value of Y. For example, as shown in disk group work process illustration 910 in FIG. 9A and FIG. 9B, when the first disk group to the $P^{th}$ disk group enter the active state and start to respectively process the first group of service requests to the $P^{th}$ group of service requests, the controller 105 may spin up the $(P+1)^{th}$ disk group to the $(P+Q)^{th}$ disk group in the storage system. It may be understood that, the Q disk groups may be spun up at any moment between a time point at which the P disk groups enter the active state and a spin up time point (T2 shown in FIG. 9A and FIG. 9B) of the $(P+1)^{th}$ disk group. This is not limited herein.

In step 825, the Q disk groups process Q groups of service requests in the request queue. Specifically, after hard disk drives in the Q disk groups are completely spun up, the Q disk groups enter the active state. The Q disk groups may respectively process Q groups of service requests in the request queue 901. In this embodiment of the present disclosure, when the value of Q is not less than 2, the Q disk groups may process the Q groups of service requests in the request queue in parallel. For example, as shown in the disk group scheduling work process illustration 910 in FIG. 9A and FIG. 9B, the $(P+1)^{th}$ disk group processes the $(P+1)^{th}$ group of service request, the $(P+Q)^{th}$ disk group processes the $(P+Q)^{th}$ group of service requests, and so on. Because the storage system 100 can allow the X+Y disk groups to be simultaneously in the active state, P+Q disk groups may be simultaneously in the active state, to respectively process P+Q groups of service requests.

It should be noted that, in this embodiment of the present disclosure, the disk groups are not sorted. To distinguish disk groups that process different service requests, in this embodiment of the present disclosure, a disk group that processes the first group of service requests is referred to as the first disk group, a disk group that processes the $P^{th}$ group of service requests is referred to as the $P^{th}$ disk group, and so on. It may be understood that, the first disk group may further process other service requests (not shown in the figure) that need to be processed by the first disk group than the first group of service requests shown in FIG. 9A and FIG. 9B.

In actual application, to shorten a service processing delay while reducing system power, when the quantity of service requests in the request queue 901 is not less than the value of X+Y, the value of P may be equal to the value of X, and the value of Q may be equal to the value of Y. In this embodiment of the present disclosure, when the quantity of service requests in the request queue 901 is greater than the value of X+Y, after the P+Q (equal to X+Y) disk groups are simultaneously in the active state, if the request queue 901 further includes a service request that needs to be processed by scheduling disk groups other than the X+Y disk groups, this embodiment of the present disclosure may further include the following steps. Certainly, in this embodiment of the present disclosure, the disk group is scheduled according to preset values of P and Q without considering the quantity of service requests in the request queue 901 and the value of X+Y. In this case, this embodiment of the present disclosure may also include the following steps. For ease of description, in the following steps, a description is made using an example in which the value of P is equal to the value of X, and the value of Q is equal to the value of Y.

In step 830, the controller 105 may determine that N of P+Q groups of service requests have been completely processed. N may be a natural number not less than 1 and less than P+Q. In this embodiment of the present disclosure, in a process of processing service requests by the P+Q disk groups, the controller 105 may obtain a processing progress of each disk group, so that the controller 105 can determine service requests that have been completely processed in the P+Q groups of service requests. Specifically, in a case, the controller 105 may obtain the processing progress of each service request in a polling manner; in another case, when a disk group completely processes a group of service requests, the disk group may actively notify the controller 105. This is not limited herein.

In step 832, the controller 105 determines whether a spin up time point of Z disk groups has arrived. Z is a natural number not less than 1 and not greater than Y. It should be noted that, in this embodiment of the present disclosure, the Z disk groups are disk groups in the storage system 100 other than the P+Q disk groups in the active state. The spin up time point of the Z disk groups is a spin up time point of one of the Z disk groups that is first spun up. When the controller 105 obtains the request queue 901, the controller 105 may obtain a spin up time point of a disk group that processes each group of service requests in the request queue 901, as shown in the disk group scheduling sequence illustration 905 shown in FIG. 9A and FIG. 9B. It may be learned according to FIG. 9A and FIG. 9B that, after the first disk group to the (P+Q)$^{th}$ (that is, (X+Y)$^{th}$) disk group are in the active state, a disk group that is first spun up and that is of Z disk groups after the (P+Q)$^{th}$ disk group is the (P+Q+1)$^{th}$ disk group, and a spin up time point of the (P+Q+1)$^{th}$ disk group is T3. If N of the P+Q groups of service requests have been completely processed before T3, the method enters step 838; if N of the P+Q groups of service requests have not been completely processed before T3, the method enters step 835.

Figure 9A:
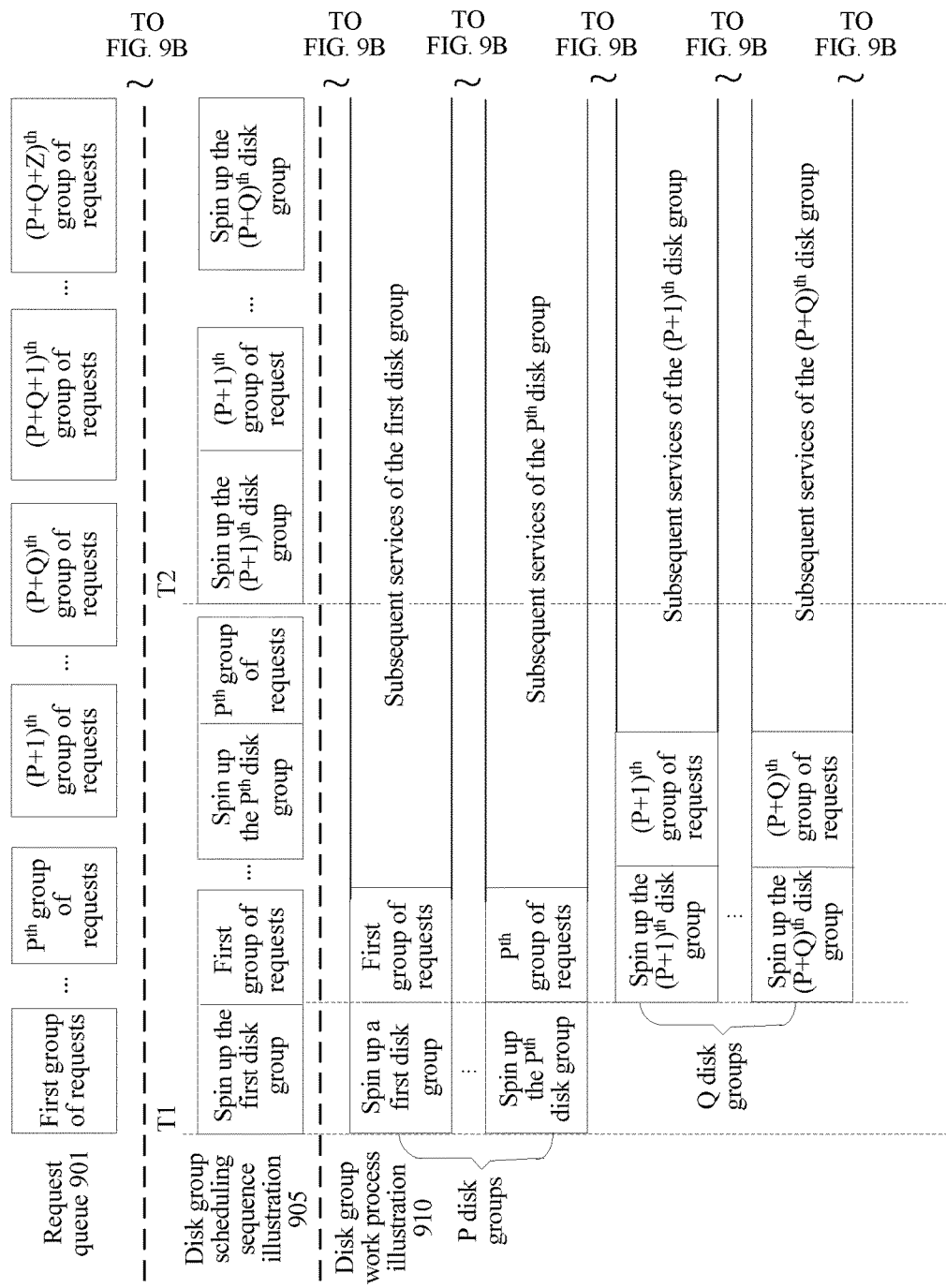
FIG. 9A and FIG. 9B are a schematic diagram of another hard disk drive scheduling method according to an embodiment of the present disclosure.
Figure 9B:
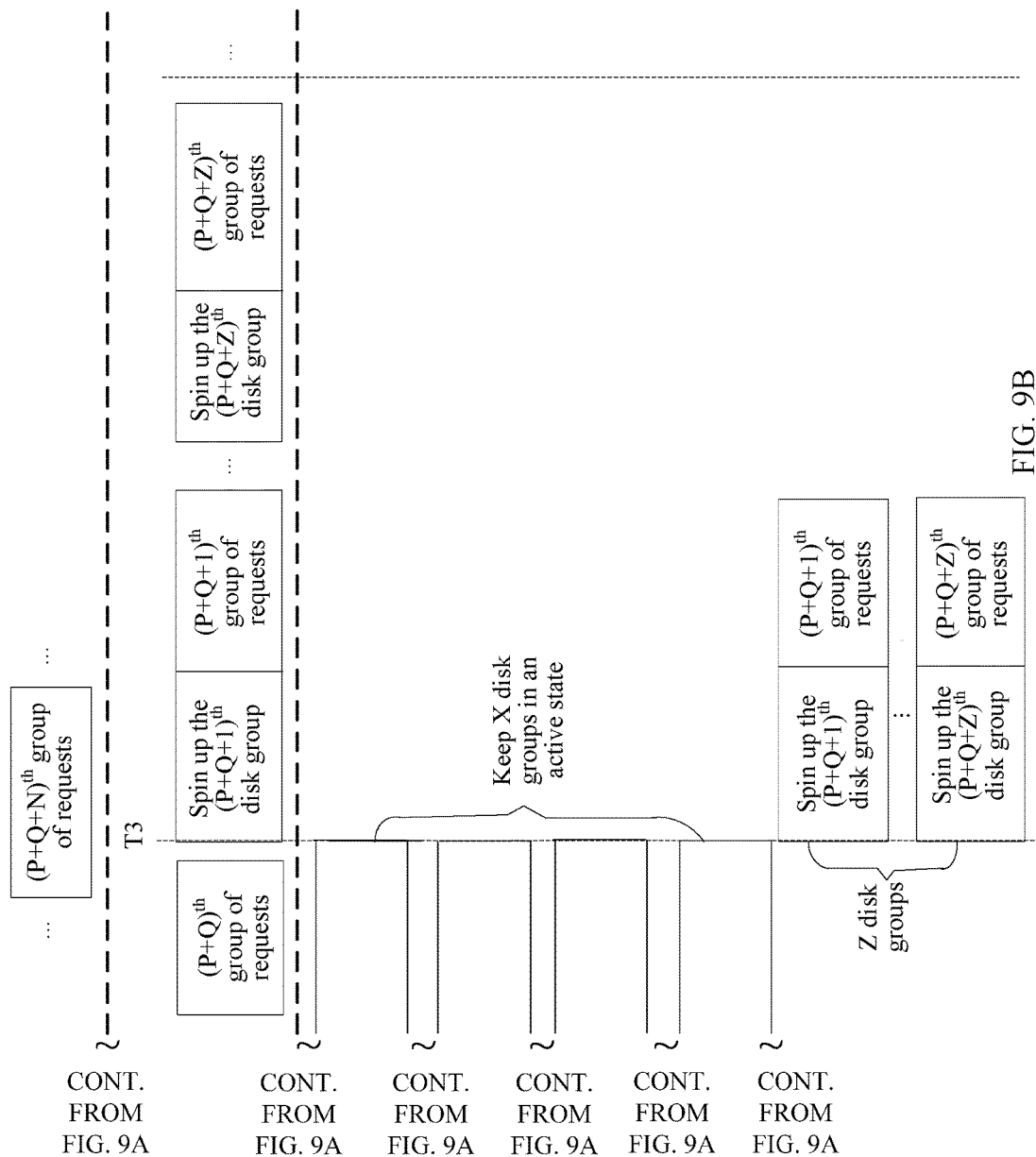

In step 838, N disk groups that are of P+Q disk groups and that have completely processed the N groups of service requests separately process subsequent service requests in the request queue. In this embodiment of the present disclosure, in step 830, when the controller 105 determines that the N of the P+Q groups of service requests have been completely processed, and in step 832, the controller 105 determines that the spin up time point of the Z disk groups other than the P+Q disk groups in the active state has not arrived, the disk groups that are of the P+Q disk groups and that have completely processed the service requests may continue to process subsequent service requests in the request queue, until the controller 105 determines that the spin up time point of the Z disk groups has arrived. For example, as shown in FIG. 9A and FIG. 9B, after the first disk group completely processes the first group of service requests, and when the controller 105 determines that T3 has not arrived, the first disk group may continue to process subsequent service requests (not shown in FIG. 9A and FIG. 9B) for the first disk group. The subsequent service requests for the first disk group are service requests that are in the request queue and that should be processed by the first disk group, and the subsequent service requests for the first disk group that are in the request queue are located after the service requests processed by the Z disk groups. For example, as shown in FIG. 9A and FIG. 9B, the subsequent service requests for the first disk group that are in the request queue 901 are located after the (P+Q+Z)$^{th}$ group of service requests. Similarly, after the (P+1)$^{th}$ disk group completely processes the (P+1)$^{th}$ group of service requests, if T3 has not arrived, the (P+1)$^{th}$ disk group may continue to process subsequent service requests of the (P+1)$^{th}$ disk group.

It should be noted that, in this embodiment of the present disclosure, in step 830, in a case, provided that the controller 105 determines that one of the first group of service requests to the (P+Q)$^{th}$ group of service requests have been completely processed, the controller 105 may enter step 832, to determine whether the spin up time point of the Z disk groups other than the P+Q disk groups has arrived. If the spin up time point of the Z disk groups has not arrived, the controller 105 may control a disk group that has completely processed service requests, to continue to process subsequent service requests that need to be processed by the disk group. In another case, the controller 105 may enter step 832 only when determining that a quantity of service requests that have been completely processed in the first group of service requests to the (P+Q)$^{th}$ group of service requests reaches a preset threshold, to determine whether the spin up time point of the Z disk groups other than the P+Q disk groups has arrived. If the spin up time point of the Z disk groups has not arrived, the controller 105 may control a disk group that has completely processed service requests, to continue to process subsequent service requests that need to be processed by the disk group.

In step 835, the controller 105 controls some of the P+Q disk groups to switch from an active state to an inactive state, so that X of the P+Q disk groups can still be kept in the active state. Specifically, the controller 105 may choose to close some disk groups that are of the P+Q disk groups and that have completely processed the service requests. Certainly, the controller 105 may choose to close some disk groups that are first spun up and that are of the P+Q disk groups or choose to close some disk groups that process low-priority service requests and that are of the P+Q disk groups. In this step, only the X disk groups need to be kept in the active state. As described in the foregoing embodiments, when closing some disk groups, the controller 105 may send a sleep command or a shut down command to the some disk groups to close hard disk drives in the some disk groups, so that the some disk groups switch from the active state to the inactive state.

In step 840, the controller 105 spins up the Z disk groups. For example, after step 835, only X disk groups in the storage system 100 are in the active state, and in step 840, the controller 105 may spin up the Z disk groups. For example, as shown in FIG. 9A and FIG. 9B, the controller 105 may spin up the (P+Q+1)$^{th}$ disk group to the (P+Q+Z)$^{th}$ disk group.

In step 845, the Z disk groups process Z groups of service requests in the request queue. After the Z disk groups are completely spun up, the Z disk groups may separately process the service requests in the request queue 901. When a value of Z is not less than 2, the Z disk groups may process multiple groups of service requests in the request queue 901 in parallel. For example, the (P+Q+1)$^{th}$ disk group processes the (P+Q+1)$^{th}$ group of service requests, and the (P+Q+Z)$^{th}$ disk group processes the (P+Q+Z)$^{th}$ group of service requests.

The embodiment shown in FIG. 8 describes a case of simultaneously scheduling more than two disk groups. In the embodiment shown in FIG. 8, although the storage system 100 cannot meet that all disk groups are simultaneously in the active state or the spin up state, the controller 105 may spin up the Q disk groups while controlling the P disk groups to be in the active state. Therefore, in a case of reducing system power, the storage system 100 can control the P+Q disk groups to process service requests in parallel, to reduce a waiting time length of the storage system 100 when a subsequent disk group is spun up, and shorten a total processing delay of multiple groups of service requests. In addition, in the embodiment shown in FIG. 8, the controller 105 schedules a disk group in the active state to process as many service requests as possible, so as to reduce a quantity of spin-up times of the disk group, reduce an average processing delay of multiple groups of service requests, and reduce average power of the storage system.

Figure 10:
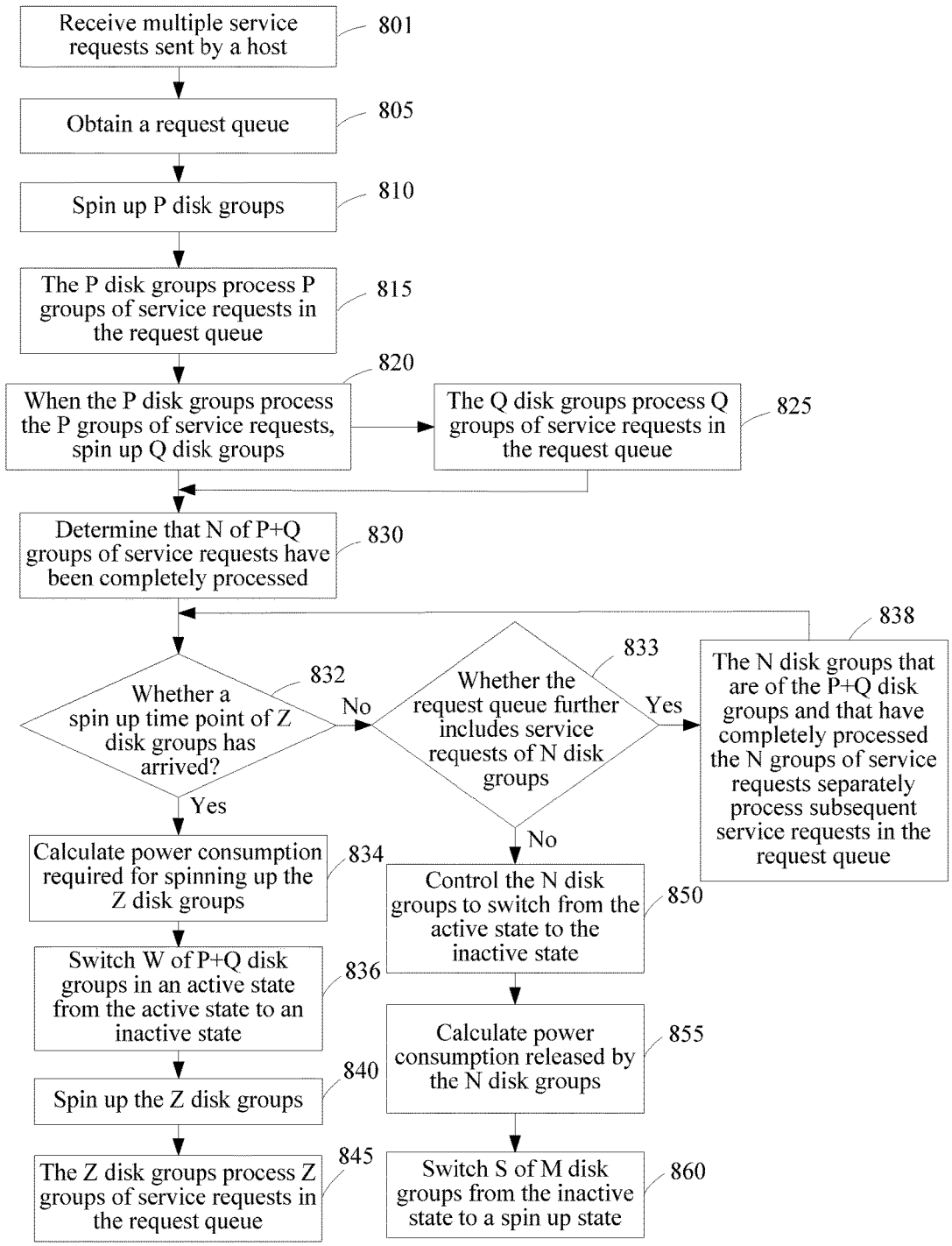
FIG. 10 is a flowchart of another hard disk drive scheduling method according to an embodiment of the present disclosure.

In another case, to further reduce system power, an embodiment of the present disclosure provides another hard disk drive scheduling method. As shown in FIG. 10, the hard disk drive scheduling method shown in FIG. 10 may still be performed by the storage system 100 shown in FIG. 1. The embodiment shown in FIG. 10 is described in detail below still using the storage system 100 including M disk groups as an example. M is a natural number not less than 4.

As shown in FIG. 10, in the embodiment shown in FIG. 10, for step 801 to step 832, refer to the description of related steps in the embodiment shown in FIG. 8. Slightly different from the embodiment shown in FIG. 8, in the embodiment shown in FIG. 10, in step 832, if the controller 105 determines that the spin up time point of the Z disk groups has arrived, the method needs to enter step 834; if the spin up time point of the Z disk groups has not arrived, the method enters step 833. In this embodiment of the present disclosure, the power supply system in the storage system 100 can still supply sufficient power to only X+Y of M disk groups simultaneously. Hard disk drives in the X disk groups are in the active state, hard disk drives in the Y disk groups are in the spin up state, both X and Y are natural numbers not less than 1, X+Y is not less than 3, and X+Y is less than M. To reduce power, how the controller 105 in this embodiment of the present disclosure spins up disk groups other than the X+Y disk groups is described in detail below using an example in which P=X and Q=Y.

In step 833, the controller 105 determines whether the request queue further includes service requests that need to be processed by N disk groups that have completely processed the N groups of service requests. If the request queue further includes service requests that need to be processed by the N disk groups, the method enters step 838; if the request queue does not include service requests that need to be processed by the N disk groups, the method enters step 850. N is a natural number not less than 1 and not greater than X+Y. In step 838, the N disk groups that are of the P+Q disk groups and that have completely processed the N groups of service requests separately process subsequent service requests to be processed by the N disk groups in the request queue, until the controller 105 determines that the spin up time point of the Z disk groups has arrived. For a specific description of this step, refer to the description of step 838 in the embodiment shown in FIG. 8. Details are not described herein again.

In step 834, the controller 105 calculates power required for spinning up the Z disk groups. To further reduce system power, and fully use a work capability of the disk group in the storage system 100, in this embodiment of the present disclosure, in a service request processing process, a quantity of disk groups in the active state may be determined according to specified maximum power required by the disk array 120. In this embodiment of the present disclosure, the maximum power required by the disk array 120 is power required by the X+Y disk groups when X disk groups in the disk array 120 are in the active state while Y disk groups are in the spin up state. A person skilled in the art may know that, power required when each hard disk drive in the storage system 100 is in a spin up state, an active state, and an inactive state may be obtained according to factory parameters of the hard disk drive. Further, the maximum power required by the disk array 120 may be obtained through a calculation according to the power required when each hard disk drive is in the spin up state, the active state, and the inactive state. After the controller 105 determines, in step 832, that the spin up time point of the Z disk groups has arrived, the controller 105 may further calculate, in this step, power required by the Z disk groups. Specifically, the controller 105 may obtain, using a product of power for spinning up one hard disk drive and a quantity of hard disk drives in the Z disk groups that need to be spun up, the power required for spinning up the Z disk groups. For example, if power required for spinning up one hard disk drive is 24 w (w), each disk group includes five hard disk drives, and Z=3, the power required for spinning up the Z disk groups is: 24 w×5×3=360 w. After the power required for spinning up the Z disk groups is obtained, the method enters step 836.

In step 836, the controller 105 switches W of the P+Q disk groups in the active state from the active state to the inactive state. W is a natural number not less than Z and less than X+Y. Power released for switching the W disk groups from the active state to the inactive state is not less than the power required for spinning up the Z disk groups. Because when the X+Y disk groups are all in the active state, the storage system 100 cannot supply sufficient power to spin up more disk groups, in this step, the controller 105 needs to switch the W of the X+Y disk groups in the active state from the active state to the inactive state, to spin up the Z disk groups. Because power required when each hard disk drive is in the active state may be obtained according to factory parameters of the hard disk drive, the controller 105 may obtain a value of W according to the power required for spinning up the Z disk groups and the power required when each hard disk drive is in the active state. For example, still using an example in which each disk group includes five hard disk drives, and power required when one hard disk drive is in the active state is 8 w, W=360 w/(5×8 w)=9. According to this manner, to spin up the Z (Z=3) disk groups, the controller 105 needs to switch nine of the X+Y disk groups in the active state from the active state to the inactive state.

When choosing to close the W disk groups, the controller 105 may choose to close some disk groups that are of the X+Y disk groups and that have completely processed service requests. Certainly, the controller 105 may choose to close some disk groups that are first spun up and that are of the X+Y disk groups or choose to close some disk groups that are processing low-priority service requests and that are of the X+Y disk groups. Specifically, the controller 105 may send a sleep command or a shut down command to the W disk groups to close the W disk groups.

In step 840, the controller 105 spins up the Z disk groups. Because in step 836, the controller 105 has closed the W disk groups according to the power required for spinning up the Z disk groups, the storage system 100 can supply power required for spinning up the Z disk groups. Therefore, in this step, the controller 105 spins up the Z disk groups. For example, the controller 105 may send a start up command or a spin up command to the Z disk groups to spin up the Z disk groups. For example, as shown in FIG. 9A and FIG. 9B, the controller 105 may spin up the $(P+Q+1)^{th}$ disk group to the $(P+Q+Z)^{th}$ disk group.

In step 845, the Z disk groups process Z groups of service requests in the request queue. Specifically, after the Z disk groups are completely spun up, the Z disk groups may separately process the service requests in the request queue 901. When a value of Z is not less than 2, the Z disk groups may process multiple groups of service requests in the request queue 901 in parallel. For example, the $(P+Q+1)^{th}$ disk group processes the $(P+Q+1)^{th}$ group of service requests, and the $(P+Q+Z)^{th}$ disk group processes the $(P+Q+Z)^{th}$ group of service requests.

In step 850, the controller 105 controls the N disk groups to switch from the active state to the inactive state. In this embodiment of the present disclosure, when in step 833, the controller 105 determines that the request queue includes no service requests that need to be processed by the N disk groups that have completely processed the N groups of service requests, indicating that the N disk groups have no service to process, the controller 105 may control the N disk groups to switch from the active state to the inactive state. Specifically, the controller 105 may send a sleep command or a shut down command to the N disk groups to close the N disk groups, to switch the N disk groups from the active state to the inactive state. It may be understood that, when the N disk groups are switched from the active state to the inactive state, the storage system 100 still includes X+Y−N disk groups in the active state.

In step 855, the controller 105 calculates power released by the N disk groups. A specific method for calculating the power released by the N disk groups may be obtained according to power of one hard disk drive in the active state and a quantity of hard disk drives in the N disk groups. The power of the hard disk drive in the active state may be obtained according to factory parameters of the hard disk drive.

In step 860, the controller 105 switches S of the M disk groups from the inactive state to a spin up state according to the power released by the N disk groups. The S disk groups are used to process service requests that need to be processed by the S disk groups and that are in the request queue. S is a natural number not less than 1 and not greater than N. It may be understood that, in this step, a quantity of disk groups that need to be spun up is obtained according to the power released by the N disk groups, power required for spinning up one hard disk drive, and a quantity of hard disk drives in the disk groups. For example, assuming that power released for closing one hard disk drive is 8 w, N=5, and each disk group includes five hard disk drives, power released for closing the N disk groups is 8×5×5=200 w, and power required for spinning up one hard disk drive is 24 w. S=200 w/(24 w×5), and a round number of a value of S is 1. That is, one disk group may be spun up according to the power released by the five disk groups. It may be understood that, in a process of spinning up the S disk groups, the storage system 100 not only includes (X+Y−N) disk groups in the active state, but also includes S disk groups in the spin up state. Because the power required for spinning up a hard disk drive is greater than power of the hard disk drive in the active state, the value of S is less than a value of N. After the S disk groups are spun up, a quantity of disk groups in the active state in the storage system 100 does not exceed X+Y. In addition, because data of a disk group that is spun up is determined according to the quantity of N closed disk groups, in this case, total power of the storage system also meets a power requirement of the storage system 100. It should be noted that, for ease of description, in this embodiment of the present disclosure, the power requirement of the storage system 100 is power of the storage system 100 when X disk groups are in the active state while Y disk groups are in the spin up state. A person skilled in the art may understand that, when power of a working disk group in the storage system 100 exceeds the power requirement of the storage system. 100, the disk group may be incapable of being spun up or working.

It may be learned from the foregoing description that, a difference between the embodiment shown in FIG. 10 and the embodiment shown in FIG. 8 lies in: in the embodiment shown in FIG. 10, the controller 105 may schedule the disk group according to power of the disk group and a quantity of disk groups that need to be spun up, so that with specified system power, a larger quantity of disk groups in the active state can be kept in the storage system 100, to use a processing capability of the storage system 100 to the greatest extent, thereby further reducing an average processing delay of multiple groups of service requests, and achieving a more flexible scheduling manner. A person skilled in the art may understand that, in the foregoing embodiments, all calculations for power may result in one estimated value. It should be noted that, for ease of description, in the embodiments shown in FIG. 8 and FIG. 10, a description is made using an example in which all disk group includes same hard disk drives. In actual application, quantities of hard disk drives in disk groups may not be equal. In a hard disk drive scheduling process, power required by the disk group may be calculated according to the quantity of hard disk drives in each disk group, to schedule different disk groups.

Figure 11:
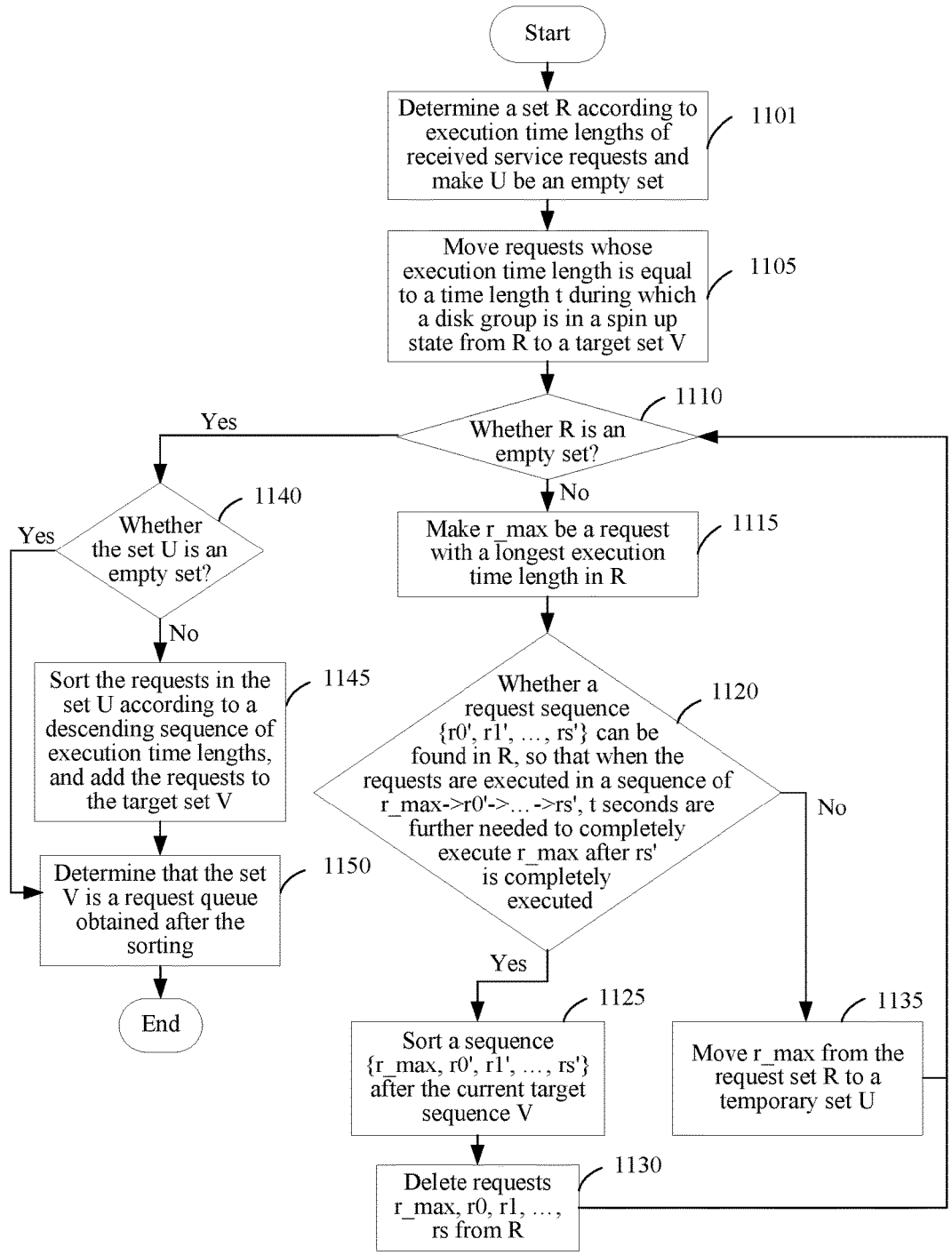
FIG. 11 is a flowchart of a method for sorting service requests according to an embodiment of the present disclosure.

It may be understood that, in the foregoing embodiments, a specific manner for sorting the service requests in the request queue is not limited, provided that the service requests in the request queue are sorted according to a processing sequence. To further reduce the average processing delay of the service requests in the storage system 100, an embodiment of the present disclosure further provides a preferred method for sorting service requests, as shown in FIG. 11. It should be noted that, a request queue obtained according to the method for sorting service requests shown in FIG. 11 may be applied to the hard disk drive scheduling method shown in FIG. 3 or FIG. 6. The method for sorting service requests shown in FIG. 11 may still be performed by the controller 105 in the storage system 100 shown in FIG. 1, and may specifically include the following steps.

In step 1101, the controller 105 determines a set R according to execution time lengths of multiple groups of received service requests. In the set R, the multiple groups of service requests are sorted according to an ascending sequence of the execution time lengths. It should be noted that, the service sorting method shown in FIG. 11 is sorting groups of service requests obtained after grouping, according to a preset time window, multiple service requests received in a preset time period. In other words, in the method shown in FIG. 11, groups of service requests are sorted in a unit of a group. One group of service requests are processed by one disk group. For example, it is assumed that the storage system 100 divides the multiple received service requests into ten groups according to the specified time window and accessed disk groups, to obtain ten groups of service requests: r1, r2, r3, r4, r5, r6, r7, r8, r9, and r10. Execution time lengths of all the groups of service requests are respectively: 10 s, 10 s, 5 s, 15 s, 20 s, 25 s, 30 s, 35 s, 40 s, and 60 s, and a time length of the disk group in a spin up state is 10 s. For the method for grouping the service requests, refer to the description of grouping of the service requests in FIG. 4. In step 1101, the controller may sort the ten groups of service requests according to an ascending sequence of the execution time lengths, to obtain the set R={r3, r1, r2, r4, r5, r6, r7, r8, r9, r10}. It should be noted that, in this embodiment of the present disclosure, R is a variable, and in different execution steps, data in the set R also varies. An execution time length of service requests is a time length required for completely executing one group of service requests.

In step 1105, the controller 105 moves service requests whose execution time length is equal to a time length t during which a disk group is in a spin up state from R to a target set V. V is initially an empty set. For example, in the foregoing example, because a time length during which the disk group is in the spin up state is 10 s, the controller 105 may move the service requests whose execution time length is equal to 10 s from the set R to the target set V. After the service requests whose execution time length is equal to the time length t during which the disk group is in the spin upstate are moved to the set V, an updated set R={r3, r4, r5, r6, r7, r8, r9, r10}, and the set V={r1, r2}. The time length during which the disk group is in the spin up state is a time length required by a hard disk drive in the disk group from starting to be spun up to being completely spun up and entering an active state and is 10 s. It may be understood that, in actual application, service requests in the set R may be further moved from the set R to the target set V, where an absolute value of a difference between the execution time length of the service requests and the time length t during which the hard disk drive is in the spin up state is not greater than a preset threshold. For example, assuming that the preset threshold is 2 s, service requests whose execution time lengths are 8 s to 12 s may be moved from the set R to the set V.

In step 1110, the controller 105 determines whether the set R is empty. Specifically, after the service requests whose execution time length is equal to the time length t during which the disk group is in the spin up state are moved from the set R to the target set V, the controller 105 may determine whether the set R from which the service requests are moved is an empty set. It may be understood that, the empty set is a set without data. When the set R is not an empty set, the method enters step 1115. When the set R is empty, the method enters step 1140.

In step 1115, the controller 105 makes r_max be a group of service requests with a longest execution time length in the set R. r_max is a specified variable. For example, in the foregoing example, after data is moved to the target set V, a service request with the longest execution time length in the set R is r10, and the controller 105 may make r_max=r10, and enters step 1120.

In step 1120, the controller 105 may determine whether a request sequence R'={r0', r1', . . . , rs'} can be found in the set R, so that when the requests are executed in a sequence of r_max→r0'→ . . . →rs', t seconds are further needed to completely execute r_max after rs' is completely executed. If the request sequence R' can be found, the method enters step 1125; if the request sequence R' cannot be found, the method enters step 1135. Specifically, in this step, the request sequence R' needs to meet that an execution time length of r_max is equal to a sum of an execution time length of a service request in the request sequence R', spin up duration of a disk group that executes a service request in R', and spin up duration t of one disk group. The request sequence R' includes multiple groups of service requests that are sorted according to an ascending sequence of execution time lengths. For example, in the foregoing example, the controller 105 needs to determine whether R' exists in the set R={r3, r4, r5, r6, r7, r8, r9, r10}. Because r_max=r10, an execution time length of r10 is 60 s, and t=10 s, whether R' exists needs to be determined, where a sum of the execution time length of the service request in R' and the spin up duration of the disk group that executes the service request in R' is equal to 50 s. Because an execution time length of r3 is 5 s, an execution time length of r6 is 25 s, spin up duration of a disk group that executes service requests of r3 and r6 is 10 s, and 5 s+10 s+25 s+10 s=50 s, the controller 105 may determine that R'={r3, r6}. It should be noted that, in this embodiment of the present disclosure, an objective of determining R' is to power on another disk group using last t seconds for executing r_max, so that when a disk group is in an inactive state after r_max is completely executed, the another disk group that has been spun up may process other service requests, to implement a seamless connection between different disk groups, and reduce a time length for processing the service processing requests.

In step 1125, the controller 105 sorts a sequence R"={r_max, r0', r1', . . . , rs'} into the current target set V. Processing sequences of service requests in R' are after service requests in the current target set V. For example, because it is determined in step 1120 that r_max in the queue is r10, and R'={r3, r6}, in this step, the controller 105 obtains a sequence R"={r10, r3, r6}. The controller 105 may sequentially sort service requests in the sequence R" into the current target set V. Specifically, because in step 1105, the controller 105 obtains the target set V={r1, r2}, after the service requests in R' are sequentially moved to the target set V, the target set V={r1, r2, r10, r3, r6} may be obtained. The method enters step 1130.

In step 1130, the controller 105 deletes service requests in the sequence R' from the set R. For example, in the foregoing example, because in step 1105, the updated set R={r3, r4, r5, r6, r7, r8, r9, r10}, in this step, after the controller 105 deletes the service requests in the sequence R" from the set R, an updated set R={r4, r5, r7, r8, r9}. After step 1130 is completely performed, the method goes back to enter step 1110, and the controller 105 continues to determine whether the updated set R is empty. If in this case, the set R is not empty, perform step 1115 to step 1135 circularly. If in this case, the set R is empty, perform step 1140 to step 1150.

In step 1135, the controller 105 moves r_max from the set R to a temporary set U. An initial value of the temporary set U is empty. Specifically, in the foregoing example, if the controller 105 fails to find a request sequence R' that meets a requirement in step 1120, r_max={r10} needs to be moved from the set R to the temporary set U. After the moving, the temporary set U={r10}, and the set R={r3, r4, r5, r6, r7, r8, r9}. After step 1135 is completely performed, the method goes back to enter step 1110, and the controller 105 continues to determine whether the updated set R is empty. If in this case, the set R is not empty, perform step 1115 to step 1135 circularly. If in this case, the set R is empty, perform step 1140 to step 1150.

In step 1140, the controller 105 determines whether the set U is an empty set. If the set U is empty, the method enters step 1150; if the set U is not empty, the method enters step 1145. For example, in the foregoing example, after step 1110 to step 1135 are performed circularly for multiple times, if the controller 105 determines that R is an empty set when step 1110 is performed again, the method enters step 1140, and the controller 105 determines whether the set U is empty. In step 1145, the controller 105 may sort service requests in the set U according to a descending sequence of execution time lengths, and add the service requests to the target set V. The method enters step 1150. In step 1150, the controller 105 determines that the set V is a request queue obtained after the sorting. For example, V may be the request queue 501 shown in FIG. 5, or may be the request queue 701 shown in FIG. 7.

For example, in the foregoing example, if an updated set R={r4, r5, r7, r8, r9} after step 1130 is completely performed for the first time, the controller 105 performs step 1115 on the updated R, determines that r_max={r9} in the set R={r4, r5, r7, r8, r9}, determines that R'={r5} in step 1120, and sorts R"={r9, r5} into the current target sequence V in step 1125. In this case, V={r1, r2, r10, r3, r6, r9, r5}, and the controller 105 obtains a new set R={r4, r7, r8} in step 1130, and performs actions of step 1110 to step 1135 again on the obtained new set R={r4, r7, r8}. For the method for sorting the service requests in the set R={r4, r7, r8}, refer to the related description of the foregoing steps. Details are not described herein again. Using the method in this embodiment of the present disclosure, after multiple circular operations, a request queue V={r1, r2, r10, r3, r6, r9, r5, r8, r4, r7} is finally obtained according to the foregoing ten groups of service requests. After the request queue V is obtained, the controller 105 may separately schedule corresponding disk groups according to the hard disk drive scheduling method shown in FIG. 3 or FIG. 6, to separately process groups of service requests in the request queue V.

When service requests are sorted according to the service request sorting method shown in FIG. 11, a service request processing time length and spin up duration of a disk group are fully considered, multiple disk groups perform processing in parallel as much as possible, and a seamless connection is implemented between work of different disk groups as much as possible. Therefore, it is ensured that when one disk group is in the active state, another disk group is in the spin up state or the active state, thereby further reducing a service processing delay based on the embodiments shown in FIG. 3 and FIG. 7.

An embodiment of the present disclosure further provides a computer program product for processing data, including a computer readable storage medium that stores program code. An instruction included in the program code is used to perform the method process described in any one of the foregoing method embodiments. An ordinary person skilled in the art may understand that the foregoing storage medium includes various non-transitory (non-transitory) machine-readable media that can store program code, such as a USB flash drive, a removable hard disk drive, a magnetic disk, an optical disc, a random-access memory (RAM), a solid state disk (SSD), or a non-volatile memory.

It should be noted that, the embodiments provided in this application are merely examples. A person skilled in the art may clearly know that, for convenience and conciseness of description, in the foregoing embodiments, the embodiments emphasize different aspects, and for a part not described in detail in one embodiment, refer to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

What is claimed is:

1. A storage device, comprising:
   M disk groups, wherein each disk group comprises at least one hard disk drive configured to store data, a status of each hard disk drive comprises an inactive state, a spin up state, and an active state, and M is a natural number not less than 3; and
   a controller, connected to the M disk groups and configured to:
      control, according to power supplied by a power supply system, a hard disk drive in a first disk group of the M disk groups to be in the active state, wherein the power supplied by the power supply system allows one of the M disk groups to be in the active state and another one of the M disk groups to be in the spin up state, the first disk group is used to process a first group of service requests in a request queue, and the active state is a state in which a platter of the hard disk drive is in a spinning state and a spin speed reaches a fixed spin speed required for processing data, and
      control, according to the power supplied by the power supply system, to switch a hard disk drive in a second disk group of the M disk groups from the inactive state to the spin up state when the hard disk drive in the first disk group is in the active state, wherein the second disk group is used to process a second group of service requests in the request queue, the inactive state is a state in which a platter of the hard disk drive does not spin, and the spin up state is a state of the hard disk drive during a period from a time point at which the hard disk drive is powered on to a time point at which a spin speed of a platter reaches a fixed spin speed required for processing data.

2. The storage device according to claim 1, wherein the controller is further configured to:
   receive multiple service requests; and
   obtain the request queue according to the multiple service requests, wherein the request queue comprises at least the first group of service requests and the second group of service requests that are sorted according to a processing sequence.

3. The storage device according to claim 2, wherein:
   the request queue further comprises a third group of service requests sorted after the second group of service requests in the request queue, and the third group of service requests are service requests to be processed by a third disk group of the M disk groups; and
   the controller is further configured to:
      determine that either of the first group of service requests and the second group of service requests have been completely processed and a spin up time point of the third disk group has not arrived, and
      control a disk group that has completely processed the service requests to process the $F^{th}$ group of service requests in the request queue, wherein the $F^{th}$ group of service requests are located after the third group of service requests in the request queue, and the $F^{th}$ group of service requests are service requests that are not processed by the disk group that has completely processed the service requests.

4. The storage device according to claim 3, wherein when the first disk group and the second disk group are simultaneously in the active state, the controller is further configured to:
   switch the first disk group or the second disk group from the active state to the inactive state when the spin up time point of the third disk group has arrived; and
   control the third disk group to switch from the inactive state to the spin up state.

5. The storage device according to claim 2, wherein:
   the request queue further comprises a third group of service requests sorted after the second group of service requests in the request queue, and the third group of service requests are service requests to be processed by a third disk group of the M disk groups;

in the request queue, an execution time length of the first group of service requests is not less than a sum of an execution time length of the second group of service requests, spin up duration of the hard disk drive in the second disk group, and spin up duration of a hard disk drive in the third disk group; and the controller is further configured to:
determine that the second disk group completely processes the second group of service requests when the first disk group processes the first group of service requests,
control the second disk group to switch to the inactive state, and
control the third disk group to switch from the inactive state to the spin up state.

6. The storage device according to claim 2, wherein:
the request queue further comprises a third group of service requests sorted after the second group of service requests in the request queue, and the third group of service requests are service requests to be processed by a third disk group of the M disk groups; and
the controller is further configured to:
determine that either of the first group of service requests and the second group of service requests have been completely processed,
control a disk group that has completely processed the service requests to switch to the inactive state, and
control the third disk group to switch from the inactive state to the spin up state.

7. A storage device, comprising:
M disk groups, wherein each disk group comprises at least one hard disk drive configured to store data, a status of each hard disk drive comprises an inactive state, a spin up state, and an active state, and M is a natural number not less than 4; and
a controller, connected to the M disk groups and configured to:
control, according to a power supply capability of a power supply system, hard disk drives in P of the M disk groups to be in the active state, wherein power supplied by the power supply system allows X of the M disk groups to be in the active state, and hard disk drives in Y of the M disk groups to be in the spin up state, both X and Y are natural numbers, a value of X+Y is greater than or equal to 3 and less than M, P is a natural number not greater than X, the P disk groups are used to process P groups of service requests in a request queue, and the active state is a state in which a platter of the hard disk drive is in a spinning state and a spin speed reaches a fixed spin speed required for processing data, and
control, according to the power supply capability of the power supply system, to switch hard disk drives in Q of the M disk groups from the inactive state to the spin up state when the hard disk drives in the P disk groups are in the active state, wherein Q is a natural number not greater than Y, the Q disk groups are used to process Q groups of service requests in the request queue, a value of P+Q is not less than 3, the inactive state is a state in which a platter of the hard disk drive does not spin, and the spin up state is a state of the hard disk drive during a period from a time point at which the hard disk drive is powered on to a time point at which a spin speed of a platter reaches a fixed spin speed required for processing data.

8. The storage device according to claim 7, wherein the controller is further configured to:
receive multiple service requests; and
obtain the request queue according to the multiple service requests, wherein the request queue comprises at least the P groups of service requests and the Q groups of service requests that are sorted according to a processing sequence.

9. The storage device according to claim 8, wherein:
the request queue further comprises Z groups of service requests to be processed by Z of the M disk groups except P+Q disk groups, and Z is a natural number not less than 1 and not greater than Y; and
the controller is further configured to:
determine that N groups of service requests of the $P^{th}$ group of service requests and the $Q^{th}$ group of service requests have been completely processed and a spin up time point of the Z disk groups has not arrived, wherein N is a natural number not greater than P+Q, and
control N disk groups that have completely processed the N groups of service requests to separately process N groups of to-be-processed service requests in the request queue, wherein the N groups of to-be-processed service requests are located after the Z groups of service requests in the request queue, and the N groups of to-be-processed service requests are separately service requests to be processed by the N disk groups.

10. The storage device according to claim 9, wherein when P=X, Q=Y, and X+Y disk groups are simultaneously in the active state, the controller is further configured to:
calculate power required for spinning up the Z disk groups when the spin up time point of the Z disk groups has arrived;
switch, according to the power required for spinning up the Z disk groups, W of the X+Y disk groups in the active state from the active state to the inactive state, wherein W is a natural number not less than Z and less than X+Y, and power released for switching the W disk groups from the active state to the inactive state is not less than the power required for spinning up the Z disk groups; and
switch the Z disk groups from the inactive state to the spin up state.

11. The storage device according to claim 9, wherein when X+Y disk groups are simultaneously in the active state, the controller is further configured to:
determine, according to the spin up time point of the Z disk groups, that the Z disk groups need to be switched from the inactive state to the spin up state;
switch the Y of the X+Y disk groups in the active state from the active state to the inactive state; and
control the Z disk groups to switch from the inactive state to the spin up state.

12. The storage device according to claim 9, wherein when N is less than P+Q, the controller is further configured to:
determine that the N of the P+Q disk groups are switched from the active state to the inactive state;
calculate power released by the N disk groups; and
switch S of the M disk groups from the inactive state to the spin up state according to the power released by the N disk groups, wherein S is a natural number not less than 1 and not greater than N, and the power released by the N disk groups is not less than power required for spinning up the S disk groups.

13. A hard disk drive scheduling method applied to a storage device, wherein the storage device comprises M disk groups, each disk group comprises at least one hard disk drive configured to store data, a status of each hard disk drive comprises an inactive state, a spin up state, and an active state, M is a natural number not less than 3, the method comprising:
controlling, according to power supplied by a power supply system, a hard disk drive in a first disk group of the M disk groups to be in the active state, wherein the power supplied by the power supply system allows one of the M disk groups to be in the active state and another one of the M disk groups to be in the spin up state, the first disk group is used to process a first group of service requests in a request queue, and the active state is a state in which a platter of the hard disk drive is in a spinning state and a spin speed reaches a fixed spin speed required for processing data; and
controlling, according to the power supplied by the power supply system, to switch a hard disk drive in a second disk group of the M disk groups from the inactive state to the spin up state when the hard disk drive in the first disk group is in the active state, wherein the second disk group is used to process a second group of service requests in the request queue, the inactive state is a state in which a platter of the hard disk drive does not spin, and the spin up state is a state of the hard disk drive during a period from a time point at which the hard disk drive is powered on to a time point at which a spin speed of a platter reaches a fixed spin speed required for processing data.

14. The method according to claim 13, further comprising:
receiving multiple service requests; and
obtaining the request queue according to the multiple service requests, wherein the request queue comprises at least the first group of service requests and the second group of service requests that are sorted according to a processing sequence.

15. The method according to claim 14, wherein:
the request queue further comprises a third group of service requests sorted after the second group of service requests in the request queue, and the third group of service requests are service requests to be processed by a third disk group of the M disk groups; and
the method further comprises:
determining that either of the first group of service requests and the second group of service requests have been completely processed and a spin up time point of the third disk group has not arrived, and
controlling a disk group that has completely processed the service requests to process the $F^{th}$ group of service requests in the request queue, wherein the $F^{th}$ group of service requests are located after the third group of service requests in the request queue, and the $F^{th}$ group of service requests are service requests that are not processed by the disk group that has completely processed the service requests.

16. The method according to claim 14, wherein:
the request queue further comprises a third group of service requests sorted after the second group of service requests in the request queue, and the third group of service requests are service requests to be processed by a third disk group of the M disk groups; and
the method further comprises:
determining that either of the first group of service requests and the second group of service requests have been completely processed,
controlling a disk group that has completely processed the service requests to switch to the inactive state, and
controlling the third disk group to switch from the inactive state to the spin up state.

17. A hard disk drive scheduling method applied to a storage device, wherein the storage device comprises M disk groups, each disk group comprises at least one hard disk drive configured to store data, a status of each hard disk drive comprises an inactive state, a spin up state, and an active state, M is a natural number not less than 4, and the method comprises:
controlling, according to a power supply capability of a power supply system, hard disk drives in P of the M disk groups to be in the active state, wherein power supplied by the power supply system allows X of the M disk groups to be in the active state, and hard disk drives in Y of the M disk groups to be in the spin up state, both X and Y are natural numbers, a value of X+Y is greater than or equal to 3 and less than M, P is a natural number not greater than X, the P disk groups are used to process P groups of service requests in a request queue, and the active state is a state in which a platter of the hard disk drive is in a spinning state and a spin speed reaches a fixed spin speed required for processing data; and
controlling, according to the power supply capability of the power supply system, to switch hard disk drives in Q of the M disk groups from the inactive state to the spin up state when the hard disk drives in the P disk groups are in the active state, wherein Q is a natural number not greater than Y, the Q disk groups are used to process Q groups of service requests in the request queue, a value of P+Q is not less than 3, the inactive state is a state in which a platter of the hard disk drive does not spin, and the spin up state is a state of the hard disk drive during a period from a time point at which the hard disk drive is powered on to a time point at which a spin speed of a platter reaches a fixed spin speed required for processing data.

18. The method according to claim 17, further comprising:
receiving multiple service requests; and
obtaining the request queue according to the multiple service requests, wherein the request queue comprises at least the P groups of service requests and the Q groups of service requests that are sorted according to a processing sequence.

19. The method according to claim 18, wherein:
the request queue further comprises Z groups of service requests to be processed by Z of the M disk groups except P+Q disk groups, and Z is a natural number not less than 1 and not greater than Y; and
the method further comprises:
determining that N groups of service requests of the $P^{th}$ group of service requests and the $Q^{th}$ group of service requests have been completely processed and a spin up time point of the Z disk groups has not arrived, wherein N is a natural number not greater than P+Q, and
controlling N disk groups that have completely processed the N groups of service requests to separately process N groups of to-be-processed service requests in the request queue, wherein the N groups of to-be-processed service requests are located after the Z groups of service requests in the request queue, and the N groups of to-be-processed service requests are separately service requests to be processed by the N disk groups.

20. The method according to claim 19, wherein when P=X, Q=Y, and X+Y disk groups are simultaneously in the active state, the method further comprises:
calculating power required for spinning up the Z disk groups when the spin up time point of the Z disk groups has arrived;
switching, according to the power required for spinning up the Z disk groups, W of the X+Y disk groups in the active state from the active state to the inactive state, wherein W is a natural number not less than Z and less than X+Y, and power released for switching the W disk groups from the active state to the inactive state is not less than the power required for spinning up the Z disk groups; and
switching the Z disk groups from the inactive state to the spin up state.

21. The method according to claim 19, wherein when N is less than P+Q, the method further comprises:
determining that the N of the P+Q disk groups are switched from the active state to the inactive state;
calculating power released by the N disk groups; and
switching S of the M disk groups from the inactive state to the spin up state according to the power released by the N disk groups, wherein S is a natural number not less than 1 and not greater than N, and the power released by the N disk groups is not less than power required for spinning up the S disk groups.

* * * * *